US006811084B2

(12) United States Patent
Tatsuta et al.

(10) Patent No.: US 6,811,084 B2
(45) Date of Patent: Nov. 2, 2004

(54) CODE READING APPARATUS, ENTERTAINMENT SYSTEM AND RECORDING MEDIUM

(75) Inventors: Seiji Tatsuta, Hino (JP); Daikichi Morohashi, Hachioji (JP); Hiroyuki Yamada, Hachioji (JP); Masayoshi Tanimura, Nakakoma-gun (JP); Hirokazu Tanaka, Kyoto (JP)

(73) Assignees: Olympus Optical Co., Ltd., Tokyo (JP); HAL Laboratory, Inc., Tokyo (JP); Creatures Inc., Tokyo (JP); Nintendo Co., Ltd., Kyoto (JP)

( * ) Notice: Subject to any disclaimer, the term of this patent is extended or adjusted under 35 U.S.C. 154(b) by 0 days.

(21) Appl. No.: 10/086,422

(22) Filed: Mar. 1, 2002

(65) Prior Publication Data

US 2002/0125318 A1 Sep. 12, 2002

(30) Foreign Application Priority Data

Mar. 6, 2001 (JP) ........................................ 2001-062090

(51) Int. Cl.[7] ................................................ G06K 7/10
(52) U.S. Cl. ........................ 235/454; 235/436; 235/460; 235/487
(58) Field of Search ............................... 235/454, 436, 235/460, 487, 494, 462.01, 462.02, 472.01; 434/308, 309–318

(56) References Cited

U.S. PATENT DOCUMENTS 5,250,747 A * 10/1993 Tsumura ................ 434/307 A
5,324,923 A * 6/1994 Cymbalski et al. ......... 235/454
5,396,054 A * 3/1995 Krichever et al. ....... 235/462.1
5,481,103 A * 1/1996 Wang ....................... 235/494
5,698,837 A * 12/1997 Furuta ....................... 235/492
5,772,213 A   6/1998 McGlew
5,790,264 A   8/1998 Sasaki et al.
5,896,403 A   4/1999 Nagasaki et al.
6,129,283 A  10/2000 Imade et al.
6,267,672 B1 * 7/2001 Vance ......................... 463/29
6,554,279 B1 * 4/2003 Vanderhye ................. 273/236

FOREIGN PATENT DOCUMENTS

| EP | 0 480 268 A2 | 5/1992 |
|----|--------------|--------|
| JP | 58-066182 B2 | 4/1983 |
| JP | 5-165488 A | 7/1993 |
| JP | 9-274638 A | 10/1997 |
| JP | 10-154202 A | 6/1998 |
| JP | 10-326324 A | 12/1998 |

* cited by examiner

Primary Examiner—Kimberly D. Nguyen
(74) Attorney, Agent, or Firm—Frishauf, Holtz, Goodman & Chick, P.C.

(57) ABSTRACT

A code reading apparatus main body optically reads a code from a recording medium, recording it as optically readable code, and stores the outcome of the reading operation and the parameters acquired during the reading operation in the data RAM of an application program storing cartridge. When a program processing apparatus reads the outcome of the reading operation as stored in the data RAM, it provides randomness to the outcome of the reading operation according to the parameters stored in the data RAM.

46 Claims, 21 Drawing Sheets

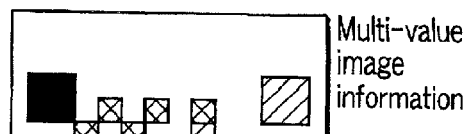
FIG. 2
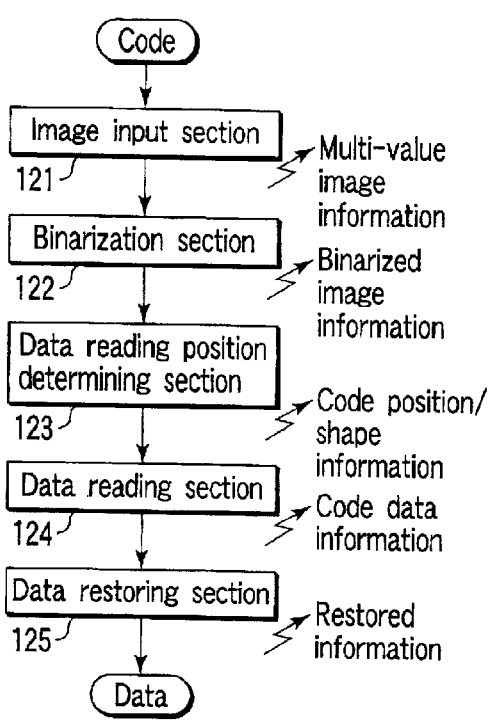
FIG. 3
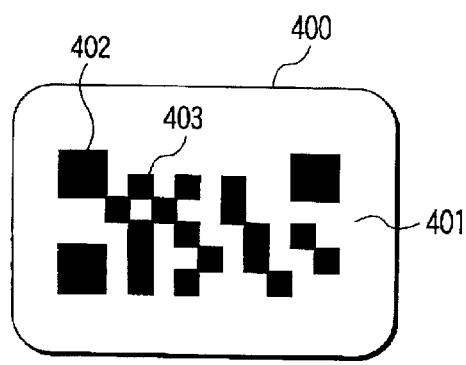
FIG. 4
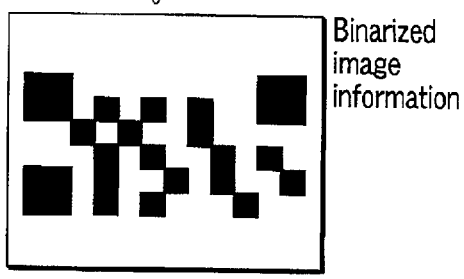
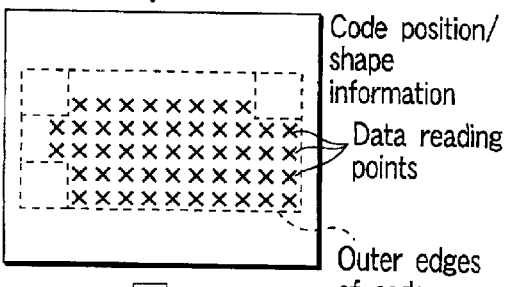
FIG. 5

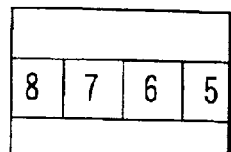
Picked up image
F I G. 22
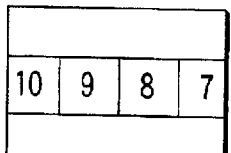
Picked up image
F I G. 23
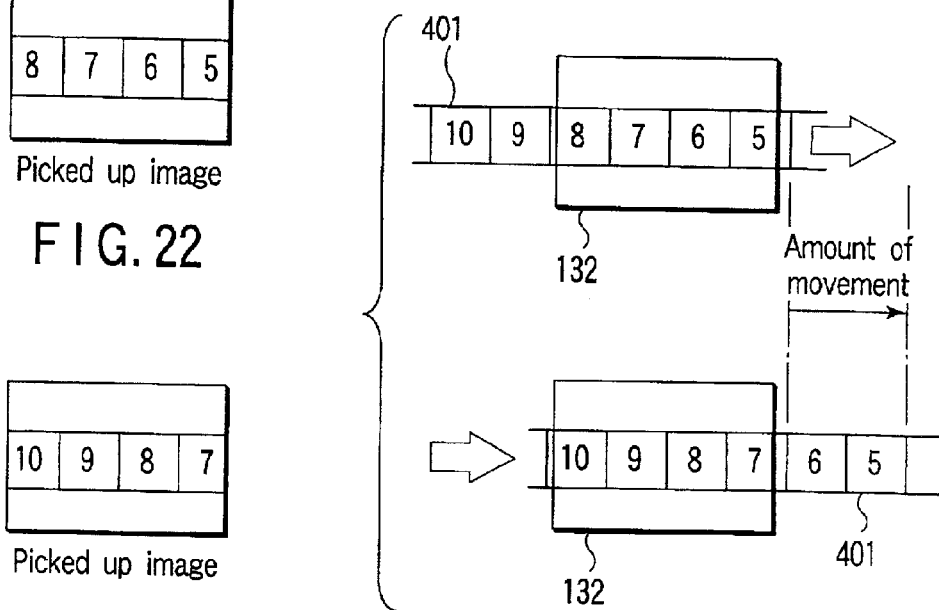
F I G. 24
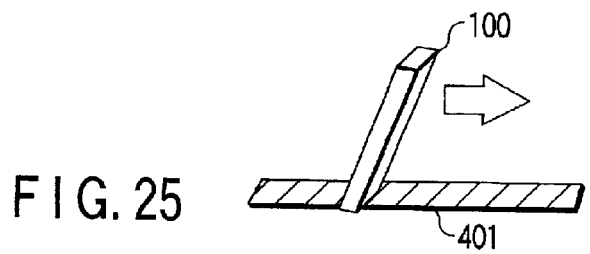
F I G. 25
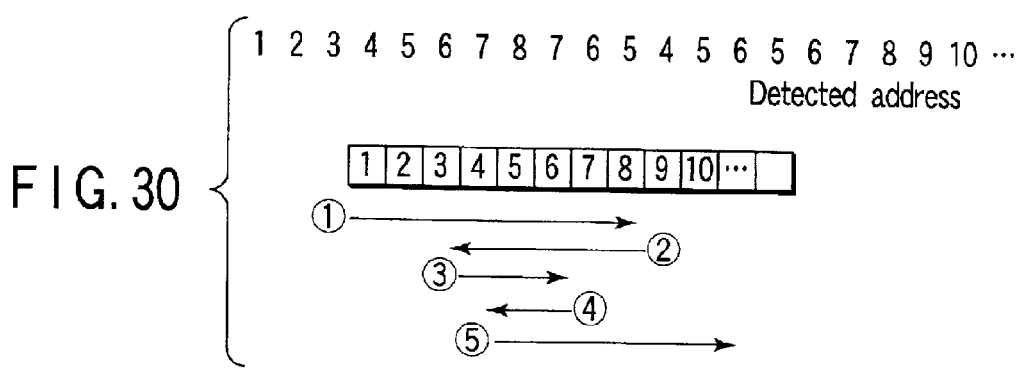
F I G. 30

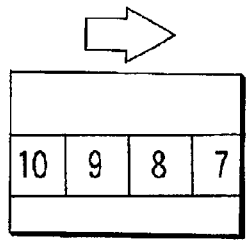
Picked up image
FIG. 26
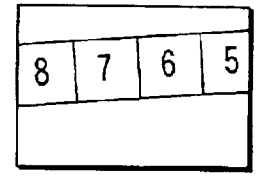
Picked up image
FIG. 27
FIG. 28
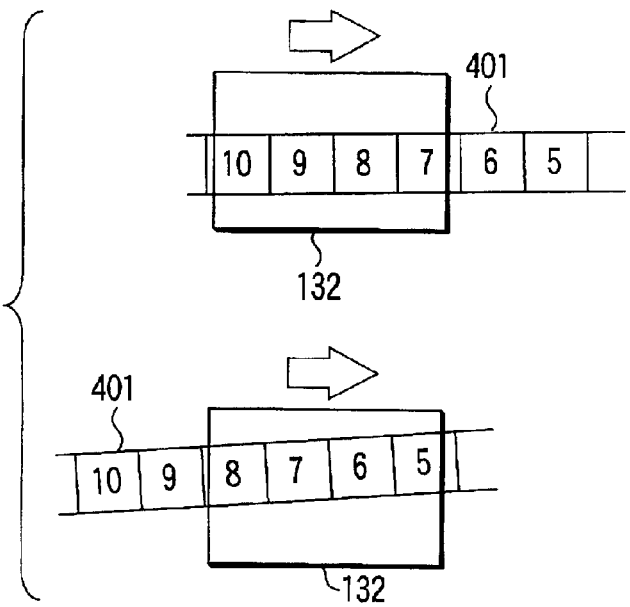
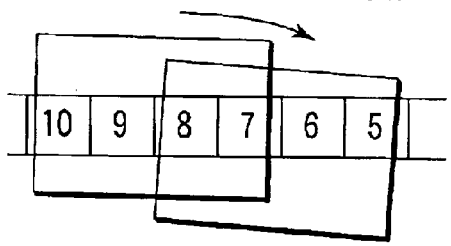
FIG. 29  Picked up images Parameter relating to
lens magnification Parameter relating to
guide position Parameter relating to
lighting condition Parameter relating to
distortion

|  | Reading environment (temperature; humidity; time; position; atmospheric pressure) | Power supply rising time; supply voltage | Maximum brightness (suspension, tilt; lighting intensity, sensor sensitivity; reflectivity) | Minimum brightness (suspension, tilt; lighting intensity, sensor sensitivity; reflectivity) | Average brightness (suspension, tilt; lighting intensity, sensor sensitivity; reflectivity) | Brightness distribution (suspension, tilt; lighting intensity, sensor sensitivity; reflectivity) | Average brightness of predetermined region | Ratio of maximum brightness/minimum brightness (density) | Brightness of code components |
|---|---|---|---|---|---|---|---|---|---|
| Parameter relating to code reading apparatus | ○ | ○ | ○ | ○ | ○ | ○ | ○ |  | ○ |
| Parameter relating to recording medium |  |  | ○ | ○ | ○ | ○ | ○ | ○ | ○ |
| Parameter relating to way of reading code |  |  | ○ | ○ | ○ | ○ | ○ |  | ○ |
| Parameter relating to code reading operation | ○ |  | ○ | ○ | ○ | ○ | ○ |  | ○ |
| Detected information | Environment information | Environment information | Multi-value image information | Multi-value image information | Multi-value image information | Multi-value image information | Multi-value image information | Multi-value image information | Multi-value image information |

F I G. 36A

| | | | | | |
|---|---|---|---|---|---|
| Threshold value information | Threshold value | | | | ○ |
| Binarized image information | Number of black pixels | | | ○ | ○ |
| | Ratio of white pixels/black pixels | | | ○ | |
| Information on positions, number, shape of code indexes (positioning indexes) | Code indexes detecting positions | ○ | | | ○ |
| | Number of detected code indexes | ○ | ○ | | |
| | Size of code indexes | ○ | ○ | ○ | ○ |
| | Shape of code indexes | ○ | ○ | ○ | ○ |
| | Center of gravity/center position of code indexes | ○ | ○ | ○ | ○ |
| | Intervals separating code indexes (size of code; size of block) | ○ | ○ | ○ | ○ |
| | Positional relationship of code indexes (shape of code; shape of block) | ○ | ○ | ○ | ○ |
| | Missing information of code indexes | ○ | ○ | | ○ |
| Address information | Address | ○ | | ○ | |
| | Number of corrected address errors (missing address data) | | | ○ | |
| | Positions of corrected address errors | | | ○ | |
| | Address missing information | ○ | | | ○ |

F I G. 36B

| Category | Parameter | | | | | | | | | | | |
|---|---|---|---|---|---|---|---|---|---|---|---|---|
| Code data information | Data reading positions | ○ | | | | | | | | | | |
| | Number of black dots, number of white dots | | ○ | | | | | | | | | | |
| | Black/white ratio | | ○ | | | | | | | | | | |
| | Data length | | ○ | | | | | | | | | | |
| | Number of read blocks | ○ | ○ | | | | | | | | | | |
| Demodulated data information | Number of 1s; number of 0s | | ○ | | | | | | | | | | |
| | 1/0 ratio | | ○ | | | | | | | | | | |
| Error correction information | Number of corrected errors (missing data) | ○ | ○ | | | | | | | | | | |
| | Positions of corrected errors | | ○ | | | | | | | | | | |
| Restored information | ID; producer; type of information | | ○ | | | | | | | | | | |
| | Recording time; amount of data | | ○ | | | | | | | | | | |
| Relative movement information | Moving speed | ○ | | | | | | | | | | | |
| | Moving direction | ○ | | | | | | | | | | | |
| | Number of movements | ○ | | | | | | | | | | | |
| | Meandering | | | ○ | | | | | | | | | |
| | Time spent from command input to shooting of code at predetermined | ○ | ○ | | | | | | | | | | |

○ represents particularly effective parameter

F I G. 36C

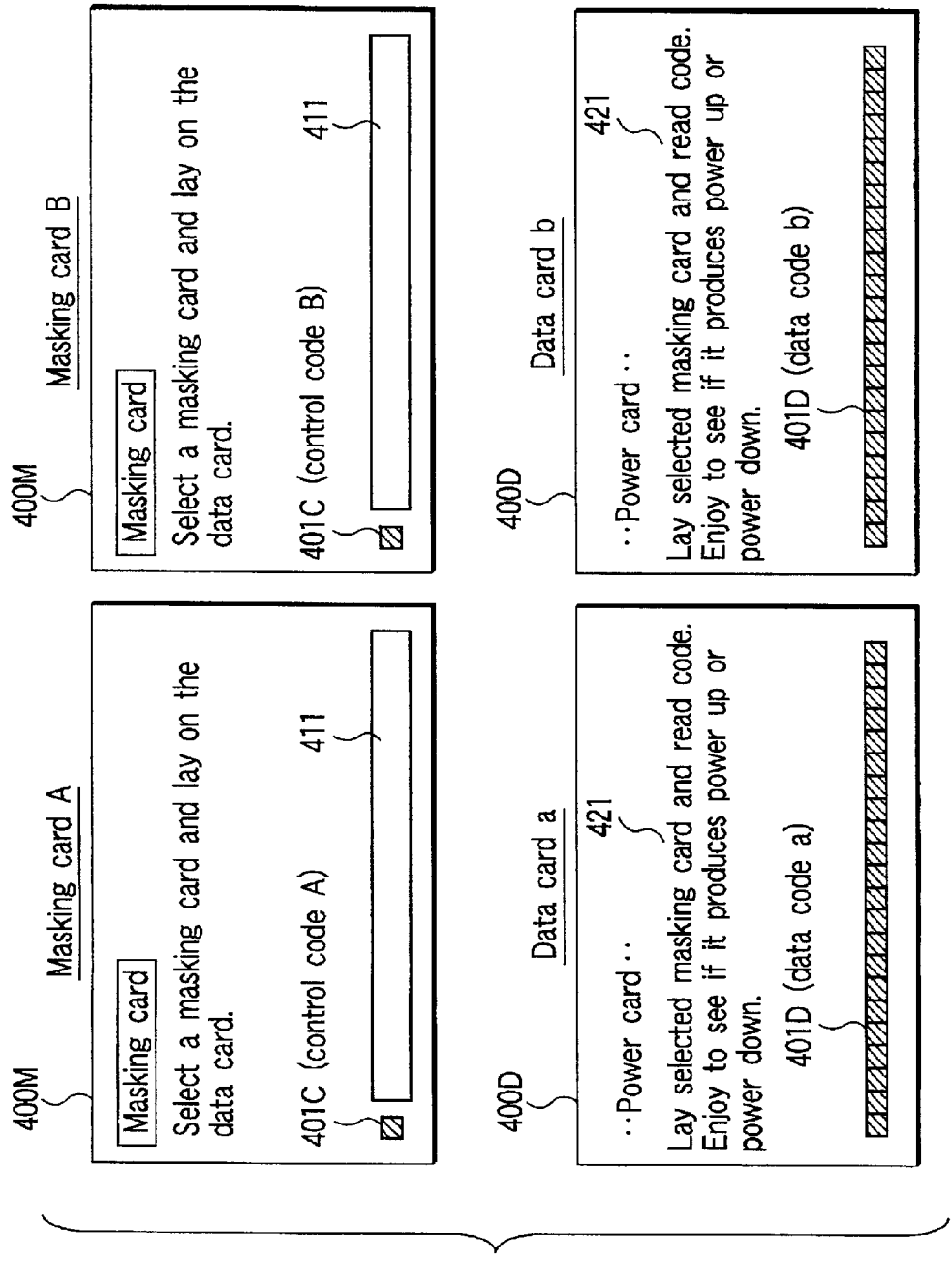
F I G. 37

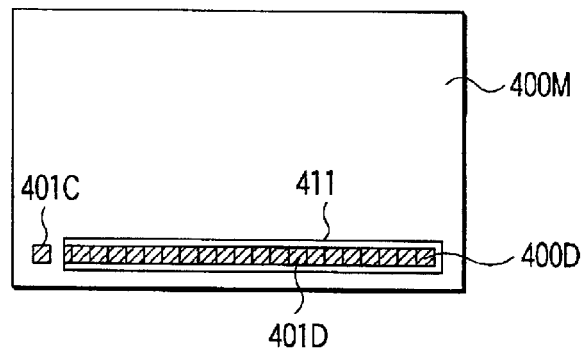
FIG. 38
FIG. 39
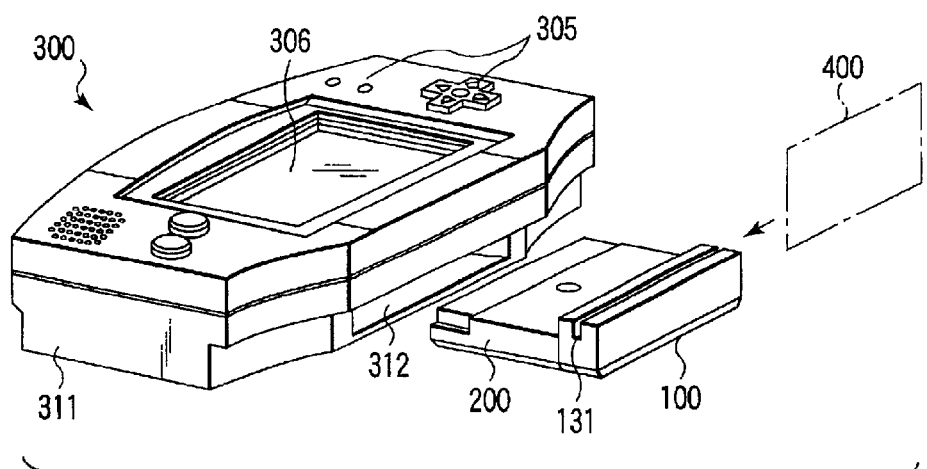
FIG. 40

| Card ID | Attribute | Data section |
|---------|-----------|--------------|

{ • Information to be provided with randomness + plurality of pieces of information to be used for providing randomness
• Information to be provided with randomness + program adapted to select a plurality of motions
• Information to be provided with randomness + program adapted to handle a plurality of program parameters

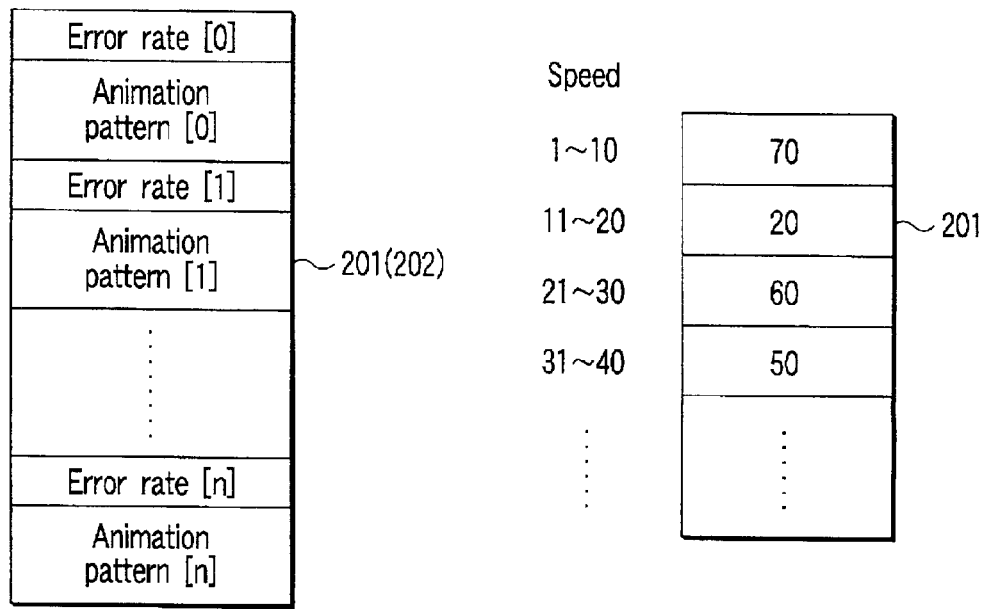
FIG. 44
FIG. 50
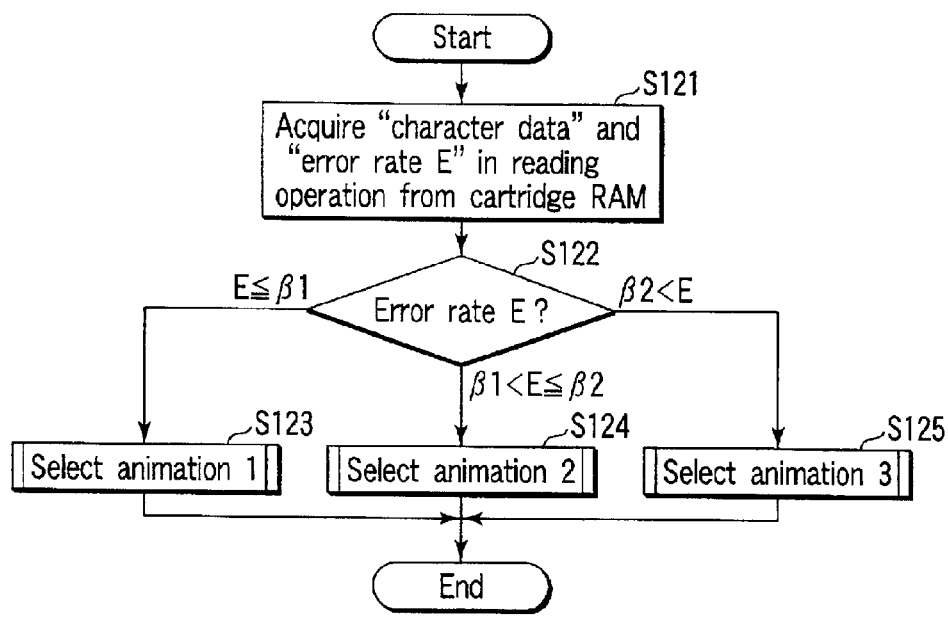
FIG. 46

CODE READING APPARATUS, ENTERTAINMENT SYSTEM AND RECORDING MEDIUM

CROSS-REFERENCE TO RELATED APPLICATIONS

This application is based upon and claims the benefit of priority from the prior Japanese Patent Application No. 2001-062090 filed Mar. 6, 2001, the entire contents of which are incorporated herein by reference.

BACKGROUND OF THE INVENTION

1. Field of the Invention

This invention relates to a code reading apparatus adapted to optically read an optically readable code on a recording medium, the recording medium recording data as the optically readable code, and also to a recording medium for recording such a code. The present invention also relates to an entertainment system using such a code reading apparatus.

2. Description of the Related Art

Various code reading apparatuses adapted to optically read a code from a recording medium on which records data as an optically readable code such as a one-dimensional or two-dimensional bar code are known.

Information output from such a known code reading apparatus of the above identified type is unequivocally defined for a code reading operation of the operator. Therefore, when such a code reading apparatus is applied to an entertainment system such as a game machine, the latter allows the user to play only simple games. Similarly, educational equipment provided with such a code reading apparatus allows the user to use only simple learning processes. Thus, such apparatus inevitably have a limit in terms of making them enjoyable to operators and exciting their interest.

BRIEF SUMMARY OF THE INVENTION

In view of the above identified circumstances, it is therefore an object of the present invention to provide a code reading apparatus comprising a randomness providing means for providing the code read by the apparatus with randomness so that the apparatus may give a surprise to the operator for an operation performed on it by the operator in order to make it suitably applicable to an entertainment system or educational equipment.

It is another object of the present invention to provide an entertainment system that comprises a code reading apparatus according to the invention and can give the user who is playing on the system a wide variety of enjoyments by utilizing the randomness provided by the code reading apparatus.

According to a first aspect of the present invention, there is provided a code reading apparatus comprising:

a reading section for optically reading an optically readable code from a recording medium on which records data as the optically readable code;

an output section for performing an output based on the outcome of the code reading operation of the reading section; and a randomness providing section for providing the outcome of the code reading operation of the reading section with randomness, thereby providing the output of the output section based on the outcome of the code reading operation with randomness.

According to a second aspect of the invention, there is provided an entertainment system comprising:

an operating section for receiving an operation command from the user;

an output section for performing at least one of a display output and a sound output adapted to vary according to the operation command received by the operating section;

a reading section for optically reading an optically readable code from a recording medium on which records data as the optically readable code; and a randomness providing section for providing the outcome of the code reading operation of the reading section with randomness at the time of the output operation of the output section on the basis of the outcome of the code reading operation of the reading section, thereby providing the output of the output section based on the outcome of the code reading operation with randomness.

According to a third aspect of the invention, there is provided a recording medium comprising:

a part recording data as an optically readable code; and a part recording no code, wherein the data recorded as a code includes information to be provided with randomness and a plurality of pieces of information to be used for providing randomness; and the output of the information to be provided with randomness is varied according to the piece of information for providing randomness selected from the plurality of pieces of information as a result of an operation of reading the code by a code reading apparatus reading.

According to a fourth aspect of the invention, there is provided a recording medium comprising:

a part recording data as an optically readable code; and a part recording no code, wherein the data recorded as a code includes information to be provided with randomness and a program adapted to select a motion out of a plurality of motions; and one of the motions is selected to vary the output of the information to be provided with randomness as a result of an operation of reading the code by a code reading apparatus reading.

According to a fifth aspect of the invention, there is provided a recording medium comprising:

a part recording data as an optically readable code; and a part recording no code, wherein the data recorded as a code includes information to be provided with randomness and a program adapted to handle program parameters; and the program parameters is varied to vary the operation of the program and also the output of the information to be provided with randomness as a result of an operation of reading the code by a code reading apparatus reading.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention and, together with the general description given above and the detailed description of the embodiments given below, serve to explain the principles of the invention.

FIG. 2 is a schematic illustration of a code that can be picked up by a single shot of image pickup operation;

FIG. 3 is a schematic block diagram of the main body of the code reading apparatus;

FIG. 4 is a schematic illustration of a code that can be recorded on a recording medium;

FIG. 5 is a schematic illustration of information that can be obtained by the functions blocks of the main body of the code reading apparatus;

FIG. 22 is a schematic illustration of an image picked up by an image pickup operation conducted at a certain time;

FIG. 23 is a schematic illustration of the image picked up by the next image pickup operation;

FIG. 24 is a schematic illustration of a method of detecting a parameter relating to the relative moving speed;

FIG. 25 is a schematic illustration of the recording medium and the code reading apparatus, illustrating a manual operation of holding the code reading apparatus and scanning the recording medium;

FIG. 26 is a schematic illustration of an image picked up by an image pickup operation conducted at a certain time;

FIG. 27 is a schematic illustration of the image picked up by the next image pickup operation;

FIG. 28 is a schematic illustration of the relationship between the code recorded on a recording medium and the image pickup regions of which are to be picked up by a code reading apparatus in each image pickup operation;

FIG. 29 is a schematic illustration of a parameter relating to a meandering motion;

FIG. 30 is a schematic illustration of a parameter relating to the directions of mutual movements and the number of times of mutual movements;

FIGS. 36A to 36C are views showing a table of parameters effective for providing randomness;

FIG. 37 is a schematic illustration of masking cards and data cards;

FIG. 38 is a schematic illustration of the masking card laid on the data card;

FIG. 39 is a schematic illustration of the randomness added to the outcome of a code reading operation according to the read out control code;

FIG. 40 is a schematic perspective view of the code reading apparatus of the first embodiment of the invention as applied to an entertainment system;

FIG. 44 is a schematic illustration of data stored in the ROM of an application program storing cartridge operating as a game cartridge;

FIG. 46 is a flow chart of another operation of the CPU of the program processing apparatus;

FIG. 50 is a schematic illustration of the data stored in the ROM of the application program storing cartridge of the code reading apparatus according to the second embodiment as used for acquiring a parameter relating the speed.

DETAILED DESCRIPTION OF THE INVENTION

Now, the present invention will be described in greater detail by referring to the accompanying drawings that illustrate preferred embodiments of the invention.

[1st Embodiment]

Figure 1:
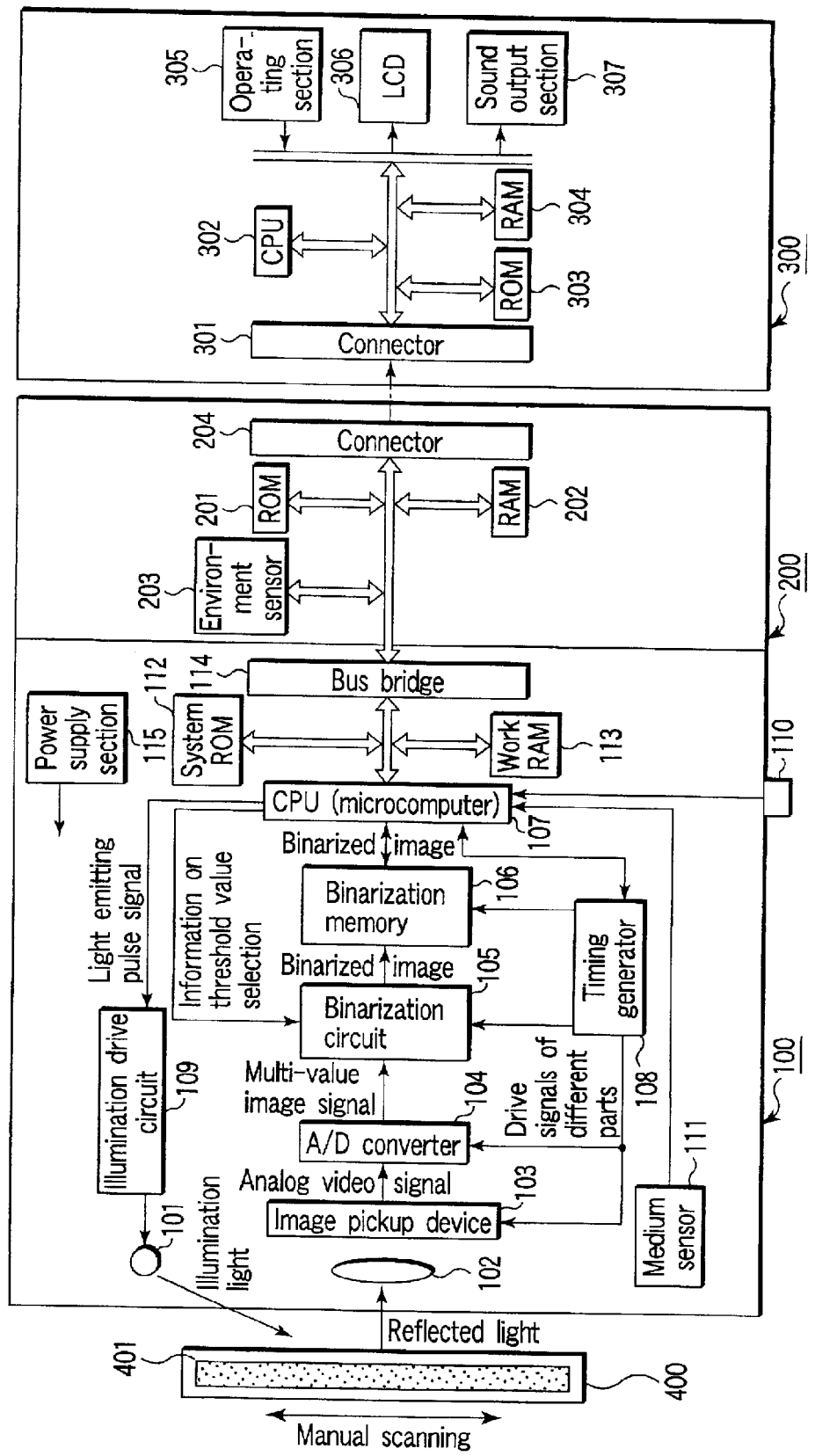
FIG. 1 is a schematic block diagram of a code reading apparatus according to a first embodiment of the invention.

Referring to FIG. 1, a code reading apparatus according to a first embodiment of the invention comprises a code reading apparatus main body 100, an application program storing cartridge 200 and a program processing apparatus 300. The main body 100 includes an illumination LED 101, a focusing lens 102, an image pickup device 103, an A/D converter 104, a binarization circuit 105, a binarization memory 106, a CPU (microcomputer) 107, a timing generator 108, an illumination drive circuit 109, operation button 110, a medium sensor 111, a system ROM 112, a work RAM 113, a bus bridge 114 and a power supply section 115. The application program storing cartridge 200 includes a program ROM 201, a data RAM 202, an environment sensor 203 and a connector 204. The program processing apparatus 300 includes a connector 301, a CPU 302, a ROM 303, a RAM 304, an operating section 305, a liquid crystal display (LCD) 306 and a sound output section 307.

The illumination LED 101 in the code reading apparatus main body 100 is used to illuminate an optically readable code 401 on a recording medium 400, the recording medium 400 recording data as the optically readable code 401. Light reflected by the code 401 is picked up by the image pickup device 103 by way of the focusing lens 102. If an entire image of the code 401 cannot be picked up by a single shot of the image pickup device 103, it can be picked up by manually scanning, i.e., by moving the main body 100 relative to the recording medium 400 or by holding the recording medium 400 and moving it relative to the main body 100. If an entire image of the code 401 can be picked up by a single shot of the image pickup device 103 as shown in FIG. 2, such a manual scanning operation is not necessary. It is also possible to set the recording medium 400 to automatically move relative to the main body 100 by a mechanical means.

The analog video signal output from the image pickup device 103 as a result of the image pickup operation is converted into a multi-value image signal by the A/D converter 104 and then into a binarized image by the binarization circuit 105, which is then stored in the binarization memory 106.

The CPU 107 processes the binarized image stored in the binarization memory 106 and restores the original data recorded as a code 401. The CPU 107 also controls the timing of driving each of the components of the main body 100, including the image pickup device 103, the A/D converter 104, the binarization circuit 105 and the binarization memory 106, by controlling the timing generator 108. Additionally, the CPU 107 controls the threshold value of binarization of the binarization circuit 105 by giving it information for selecting a value as the threshold value and also the light emitting operation of the illumination LED 101 by transmitting it a light emitting pulse signal to the illumination drive circuit 109.

The operation of controlling the components by the CPU 107 is started by operation command information issued in response to the operation button 110 being operated. Alternatively, it may be so arranged that the operation of controlling the components by the CPU 107 is started in response to a detection signal issued from the medium sensor 111 operating on the recording medium 400. Namely, the operation button 110 and the medium sensor 111 may be provided alternatively, or may be provided both.

The system ROM 112 is a non-volatile memory storing the operation program of the CPU 107 and various data. The work RAM 113 is a memory for temporarily storing various data while the CPU 107 is in operation.

The bus bridge 114 is provided to coordinate the system bus of the CPU 107 and the bus in the application program storing cartridge 200. As a result of a coordinated operation of the bus bridge 114, the CPU 107 can transmit the restored data and various other data to the application program storing cartridge 200.

As will be described in greater detail hereinafter, the CPU 107 is also adapted to detect parameters including one for brightness from the multi-value image information from the A/D converter 104 and transmit them to the application program storing cartridge 200 by way of the bus bridge 114. Additionally, the CPU 107 is also adapted to transmit various parameters obtained in the course of operation of processing the binarized image information from the binarization memory 106 and restoring the original data to the application program storing cartridge 200.

The power supply section 115 is used to feed power to the components of the main body 100. It may alternatively be so arranged that power from the power sources of different components of the main body 100 is fed to the program processing apparatus 300 by way of the application program storing cartridge 200.

On the other hand, the program ROM 201 of the application program storing cartridge 200 is a non-volatile memory for storing the application program to be executed by the CPU 302 of the program processing apparatus 300. The data RAM 202 is a memory for storing the restored data and various parameters fed from the CPU 107.

The environment sensor 203 is adapted to detect various environmental values including temperature, humidity, time, location and atmospheric pressure. A GPS or the location acquisition service of a PHS may be used for detecting the current location of the system.

The connector 204 is used to electrically connect the connector 301 of the program processing apparatus 300 and the application program storing cartridge 200. It may typically be an edge connector having a plurality of contacts arranged along the edge of a substrate. The bus in the application program storing cartridge 200 and the system bus in the program processing apparatus 300 are connected to each other by means of the connectors 204 and 301. As a result of the connection, the CPU 302 of the program processing apparatus 300 can read the application program stored in the program ROM 201, the data and the parameters stored in the data RAM 202 and the values detected by the environment sensor 203.

Although not shown in FIG. 1, power is supplied to the components of the application program storing cartridge 200 from the program processing apparatus 300.

On the other hand, the ROM 303 of the program processing apparatus 300 is a non-volatile memory for storing the operation program of the CPU 302 and various data. The RAM 304 is a memory for temporarily storing various data while the CPU 302 is in operation.

The operating section 305 comprises user buttons for issuing a command for a desired operation to the CPU 302. The LCD 306 is used to display image data under the control of the CPU 302. The sound output section 307 is used to output sound data under the control of the CPU 302.

When the program processing apparatus 300 is designed to operate for a video game machine, the LCD 306 is replaced by a terminal for connecting a television monitor (not shown) and a video signal generator (not shown) for converting image data into an image signal (video signal or RGB signal) under the control of the CPU 302.

In a code reading apparatus having the above described configuration, the CPU 302 of the program processing apparatus 300 changes the display output of the LCD 306 and outputs sound from the sound output section 307 according to the application program stored in the program ROM 201 of the application program storing cartridge 200 and the operation performed at the operating section 305. Whenever necessary, the main body 100 reads the data recorded on the recording medium 400 as the optically readable code 401, and the outcome of the reading operation is stored in the data RAM 202 of the application program storing cartridge 200, and the CPU 302 of the program processing apparatus 300 reads out the outcome of the operation of reading the code and outputs respectively an image and/or a sound from the LCD 306 and/or sound output section 307 according to the outcome of the code reading operation.

While the above operation is similar to that of any known code reading apparatus, the embodiment of code reading apparatus additionally detects parameters, which will be described in greater detail hereinafter, in the main body 100 or the application program storing cartridge 200 and stores them in the data RAM 202 during the code reading operation, and then the CPU 302 of the program processing apparatus 300 provides the outcome of the code reading operation with randomness according to the stored parameters.

Now, the means for providing randomness and some of the specifics of such randomness will be discussed below.

Firstly, the means for providing randomness will be described.

FIG. 3 is a block diagram illustrating the operation of the code reading apparatus main body 100 along with some of its functional features. Referring to FIG. 3, the image input section 121 of the main body 100 comprises the illumination LED 101, the focusing lens 102, the image pickup device 103 and the A/D converter 104 and picks up the optically readable code 401 to obtain a multi-value image. Then, the multi-value image is binarized by binarization section 122 that corresponds to the binarization circuit 105, the binarization memory 106 and the CPU 107. The data reading position determining section 123 that also corresponds to the CPU 107 determines the data reading points of the binarized image and obtains code position/shape information. Then, the data reading section 124 that also corresponds to the CPU 107 reads the image data located at the data reading points to obtain the code data. Thereafter, the data restoring section 125 that also corresponds to the CPU 107 decodes the code data and obtains the restored information, or the original data.

Assume that the code 401 recorded on the recording medium 400 is such as the one shown in FIG. 4, including code indexes 402 indicating that it is a code 401 and data 403 expressed by using black and white squares that respectively represents "1"s and "0"s. Then, the multi-value image information obtained by the image input section 121, the binarized image information obtained by the binarization section 122, the code position/shape information obtained by the data reading position determining section 123, the code data information obtained by the data reading section 124 and the restored information obtained by the data restoring section 125 are such as those shown in FIG. 5.

The multi-value image information, the binarized image information, the code position/shape information, the code data and the restored information are stored in the data RAM 202 of the application program storing cartridge 200 by the CPU 107 by way of the bus bridge 114. Subsequently, any of them is read out by the CPU 302 of the program processing apparatus 300 so that the output data of the restored information, that used to be recorded as code 401 may be provided with randomness.

Figure 6:
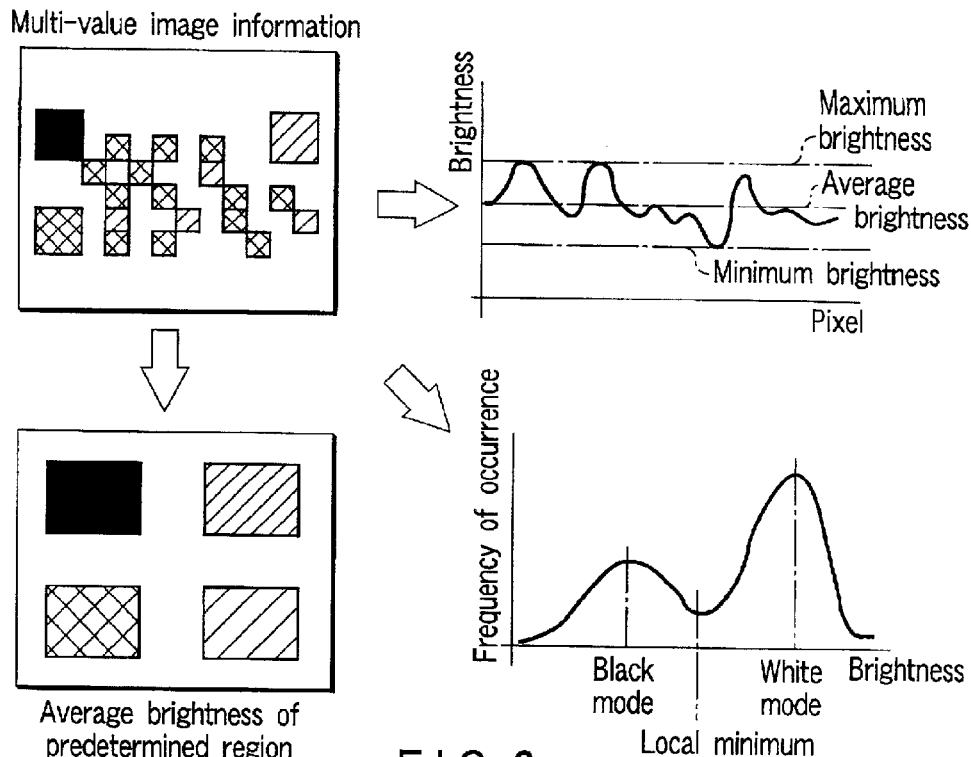
FIG. 6 is a schematic illustration of parameters relating to brightness information that can be obtained from a piece of multi-value image information.

The parameters of the maximum brightness, the minimum brightness or the average brightness as shown in the upper right graph of FIG. 6 can be obtained from the multi-value image information by detecting the brightness of each pixel. Also, the parameters of the black mode, the white mode or the local minimum as shown in the lower right graph of FIG. 6 can be obtained by detecting the frequency of occurrence of each brightness level. Furthermore, it is also possible to arrange a plurality of predetermined regions in the picked up image as shown in the lower left frame of FIG. 6 and obtain the parameters of the average brightness of each of the regions. As a matter of course, it is also possible to obtain the parameters of the maximum brightness, the black mode, etc. of each predetermined region.

Figure 7:
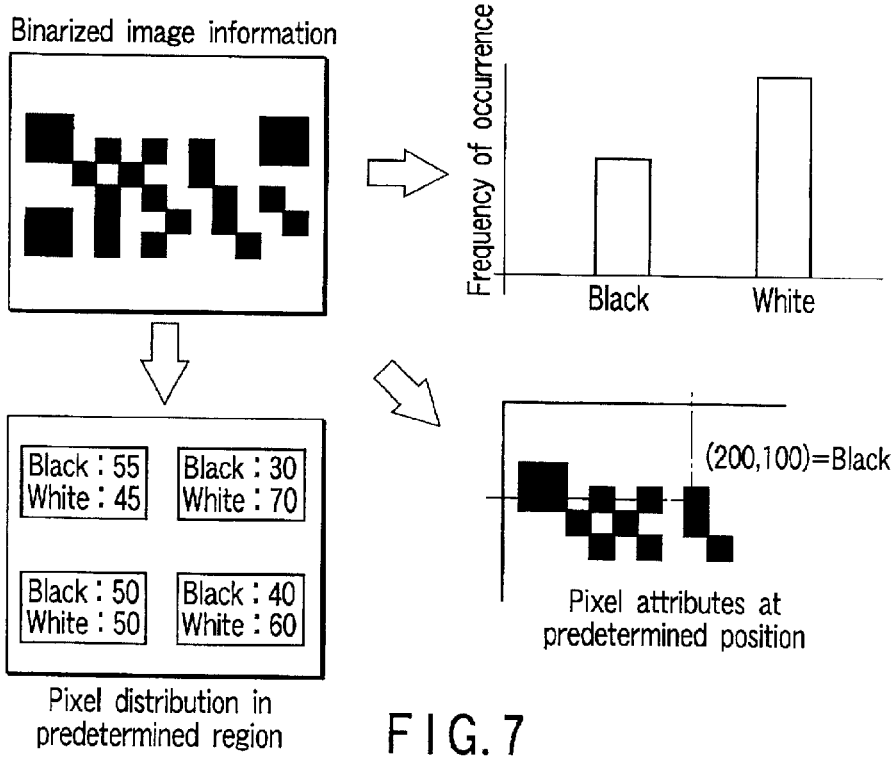
FIG. 7 is a schematic illustration of parameters relating to pixel attributes that can be obtained from a piece of binarized image information.

The parameters of the frequency of occurrence of a white pixel and that of a black pixel as shown upper right in FIG. 7 can be obtained from the binarized image information. It is also possible to obtain the parameters of pixel attribute indicating that the pixel at a predetermined position is a black pixel or a white pixel as shown lower right in FIG. 7. Furthermore, it is also possible to obtain the parameters of pixel distribution in each predetermined region indicating the percentage of area of black pixels and that of white pixels in each predetermined region as shown lower left in FIG. 7.

Figure 8:
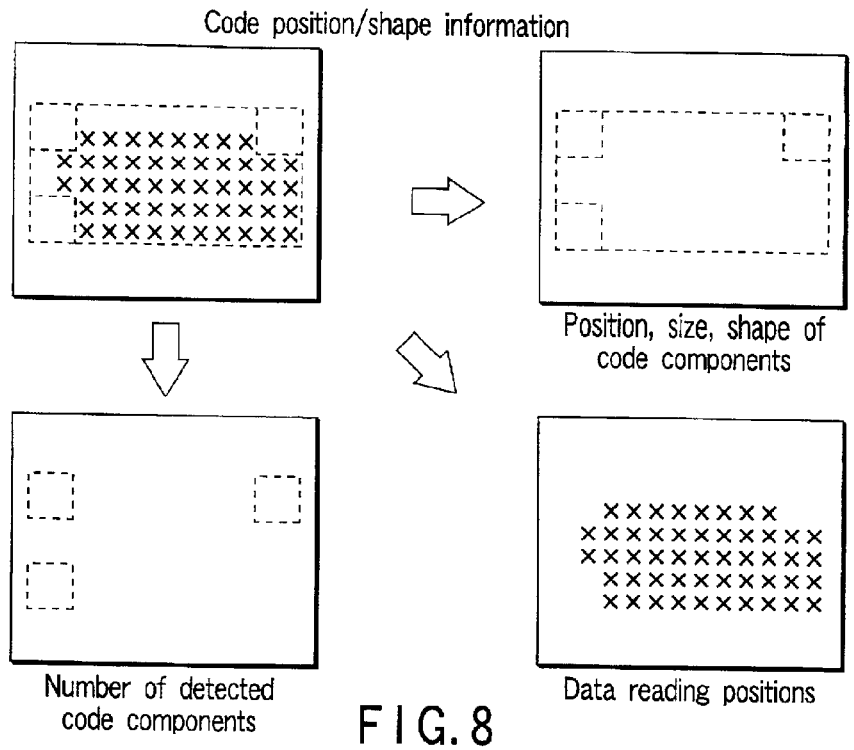
FIG. 8 is a schematic illustration of parameters relating to position/shape that can be obtained from a piece of code position/shape information.

The parameters of the position, the size and the shape of each code component as shown upper right in FIG. 8 can be obtained from the code position/shape information. It is also possible to obtain the parameters of the positions where the data are to be read as shown lower right in FIG. 8. Furthermore, it is also possible to obtain the parameters of the number of detected code components such as code indexes 402 as shown lower left in FIG. 8.

Figure 9:
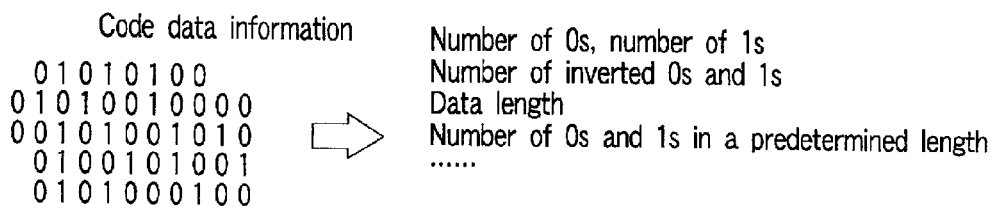
FIG. 9 is a schematic illustration of parameters relating to a code data that can be obtained from a piece of code data information.

The parameters of the number of "0"s, that of "1"s, that of inverted "0"s and "1"s, data length, the number of "0"s and "1"s in a predetermined length, those of consecutive "0"s, those of consecutive "1"s and so on as shown in FIG. 9 can be obtained from the code data information.

Figure 10:
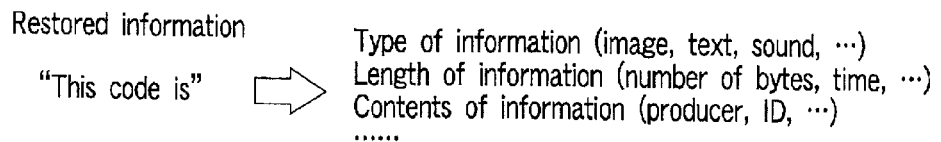
FIG. 10 is a schematic illustration of parameters relating to restored information that can be obtained from a piece of restored information.

Finally, the parameters of the type of information (image, text, sound, etc.), the length of information (number of bytes, time, etc.) and the contents of information (the producer who prepared the information, the ID of the code, that of the recording medium, etc.) as shown in FIG. 10 can be obtained from the restored information.

Figure 11:
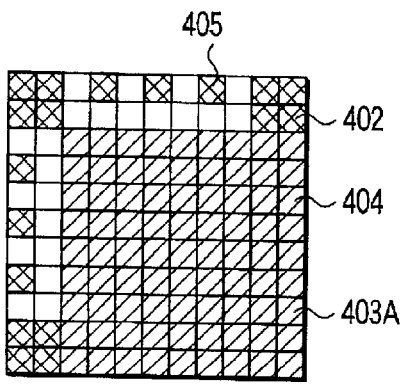
FIG. 11 is a schematic illustration of an ordinary two-dimensional bar code.
Figure 12:
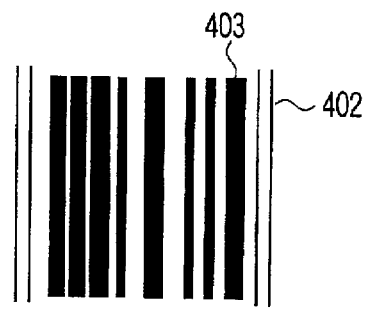
FIG. 12 is a schematic illustration of an ordinary one-dimensional bar code.

The code 401 may be a two-dimensional code as shown in FIG. 11 or a one-dimensional bar code as shown in FIG. 12.

In the case of a two-dimensional code as shown in FIG. 11, code indexes 402 are arranged at three of the four corners of the code and data cells 403A are recorded as data in data region 404. If there are a large number of data cells 403A, positioning indexes 405 are arranged between two code indexes 402 in order to improve the positioning accuracy.

In the case of a one-dimensional bar code as shown in FIG. 12, code indexes 402 are arranged at the opposite ends of the code, and bars are recorded between them as data 403.

Figure 13:
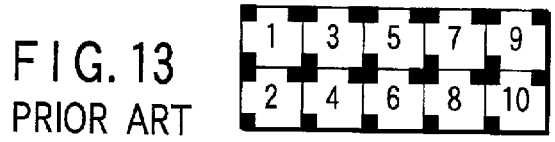
FIG. 13 is a schematic illustration of a known code comprising a plurality of blocks.

A code comprising a number of blocks may be used as shown in FIG. 13. Each block of such a code can be prepared by adding address information to the code as shown in FIG. 11.

Figure 14:
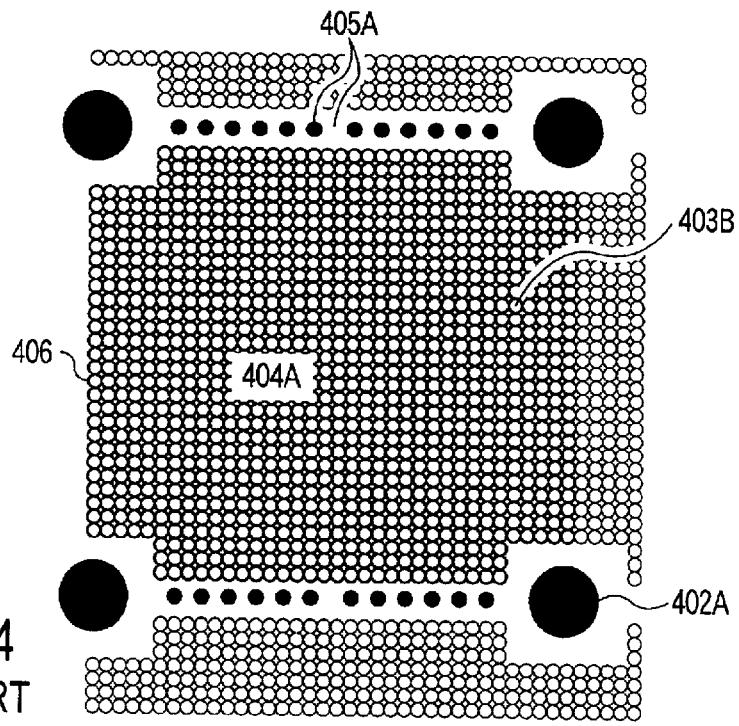
FIG. 14 is a schematic illustration of a block of a known dot code, showing its configuration.

A dot code comprising a number of blocks as disclosed in U.S. Pat. No. 5,866,895 is also known. As shown in FIG. 14, each block contains block data 404A, markers 402A, pattern dots 405A and a block address pattern 406. The block data 404A is a region in which dots corresponding to data to be recorded are arranged two-dimensionally in a predetermined manner. The markers 402A are arranged at the four corners of the block and used to locate reading reference points for reading each dot (data dot 403B) of the block data 404A. Each marker 402A is formed by arranging a predetermined number of black dots. The pattern dots 405A are a group of isolated dots arranged between the markers 402A and used to accurately locate the reading reference points. The block address pattern 406 is arranged also between the markers 402A for the purpose of identifying the block and contains the address of the block and an error detection or correction code.

Figure 15:
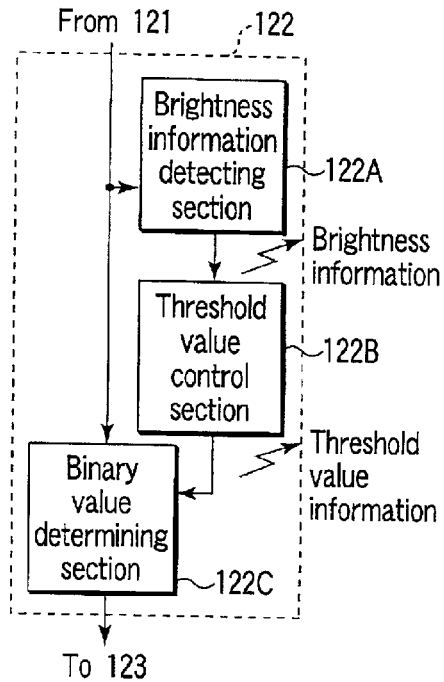
FIG. 15 is a schematic block diagram of a binarization section of the code reading apparatus, illustrating its configuration and pieces of information that can be obtained by it.

As shown in FIG. 15, the binarization section 122 may be made to comprise a brightness information detecting section 122A, a threshold value control section 122B and a binary value determining section 122C. Naturally, the brightness information detecting section 122A and the threshold value control section 122B are arranged in the CPU 107 and the binary number determining section 122C is arranged in the binarization circuit 105.

Thus, the brightness contained in the multi-valued image information from the image input section 121 is detected by the brightness information detecting section 122A, and the threshold value control section 122B determines the threshold value for binarization, using this brightness information (e. g., an intermediate value between the maximum and minimum brightness levels is used as the threshold value). Then, the determined threshold value information is sent to the binary value determining section 122C of the binarization circuit 105 as information to be for selecting a threshold value and used for the operation of binarizing the multi-value image information from the image input section 121.

With the above described configuration, the brightness information detecting section 122A provides brightness information to make it possible to extract parameters such as the maximum brightness, while the threshold control section 122B provides threshold value information.

Figure 16:
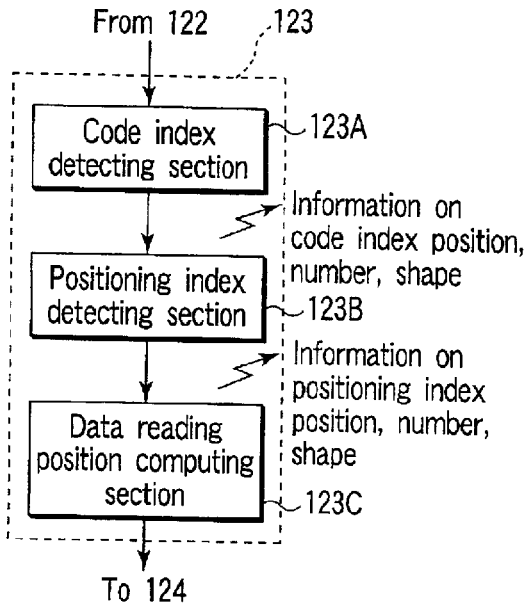
FIG. 16 is a schematic block diagram of a data reading position determining section of the code reading apparatus, illustrating its configuration and pieces of information that can be obtained by it.

When a code containing positioning indexes as shown in FIG. 11 or FIG. 14 is used, the data reading position determining section 123 is made to comprise a code index detecting section 123A, a positioning index detecting section 123B and a data reading position computing section 123C as shown in FIG. 16.

Thus, the code index detecting section 123A detects the image of the code indexes 402 (markers 402A) from the binarized image from the binarization section 122 and the positioning index detecting section 123B detects the image of the positioning indexes 405 (pattern dots 405A) arranged between the code indexes 402 (markers 402A). Then, the data reading position computing section 123C computationally determines the data reading positions in the binarized image according to the detected locations of the code indexes and those of the positioning indexes.

With the above described arrangement, information on the positions, the number and the shape of the code indexes can be obtained from the code index detecting section 123A while information on the positions, the number and the shape of the positioning indexes can be obtained from the positioning index detecting section 123B.

Figure 17:
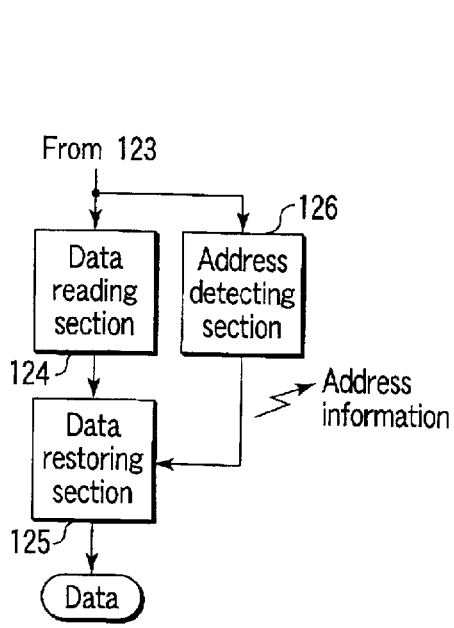
FIG. 17 is a schematic block diagram of the main body including an address detecting section of the code reading apparatus.

If a code comprising a number of blocks as shown in FIG. 13 or FIG. 14 is used, the code reading apparatus main body 100 needs to further comprise an address detecting section 126 as shown in FIG. 17, the address detecting section 126 being formed by the CPU 107.

Then, in parallel with the operation of the data reading section 124 for reading the data at the positions where the data is to be read as determined by the data reading position determining section 123, the address detecting section 126 detects the addresses of the blocks containing the data. Subsequently, the data restoring section 125 restores the original data by rearranging the data read by the data reading section 124 according to the addresses detected by the address detecting section 126.

With this arrangement, it is possible to obtain address information from the address detecting section 126.

Figure 18:
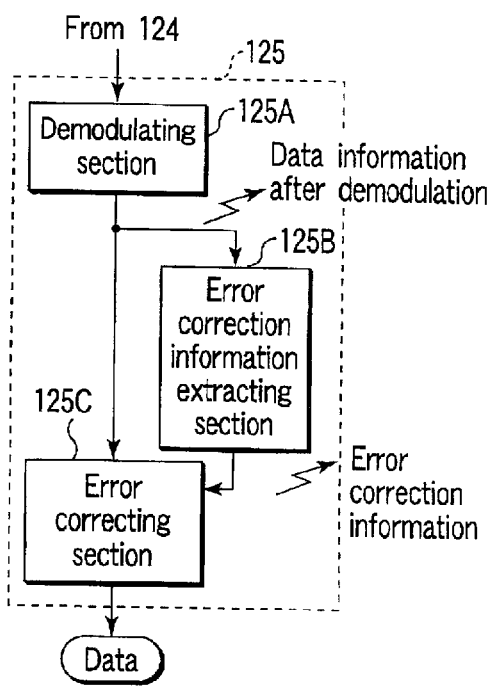
FIG. 18 is a schematic block diagram of a data restoring section of the code reading apparatus, illustrating its configuration and pieces of information that can be obtained by it.

Normally, code data is modulated and/or error correction data is added thereto. When such a code is used, the data restoring section 125 needs to comprise a demodulating section 125A, an error correction information extracting section 125B and an error correcting section 125C as shown in FIG. 18.

As disclosed in U.S. Pat. No. 5,896,403, when data is recorded as an optically readable code 401, the code is generally modulated. Therefore, the demodulating section 125A that is provided to handle modulated data demodulates the data read by the data reading section 124. Then, the error correction information extracting section 125B extracts the error correction information from the data demodulated by the demodulating section 125A and the error correcting section 125C corrects the errors in the data demodulated by the demodulating section 125A according to the extracted error correction information.

With the above described arrangement, the demodulating section 125A provides data information after demodulation and the error correction information extracting section 125B provides error correction information including the number and the positions of corrected errors.

Figure 19:
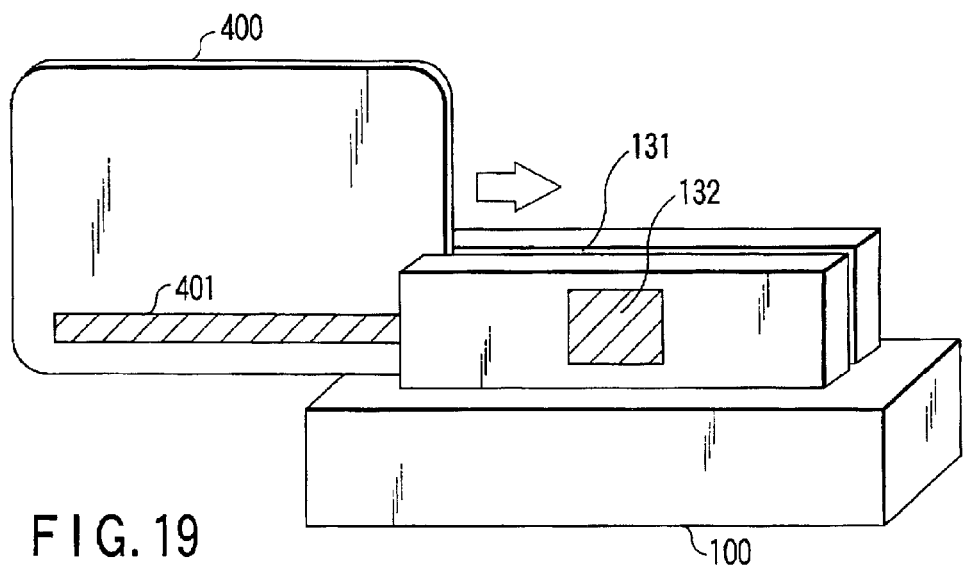
FIG. 19 is a schematic perspective view of a recording medium and the code reading apparatus according to the invention, illustrating a manual operation of holding and scanning the recording medium.

Normally, the code 401 is typically recorded along an edge of a card-shaped recording medium 400 as shown in FIG. 19. When the code 401 is manually scanned, the operator holds the recording medium 400 and moves it along the slit 131 arranged in the code reading apparatus main body 100 in order to make the image pickup device 103 pick up an image of the entire code 401 into the image pickup region 132 of the image pickup device 103 that is located at a predetermined position in the slit 131.

Figure 20:
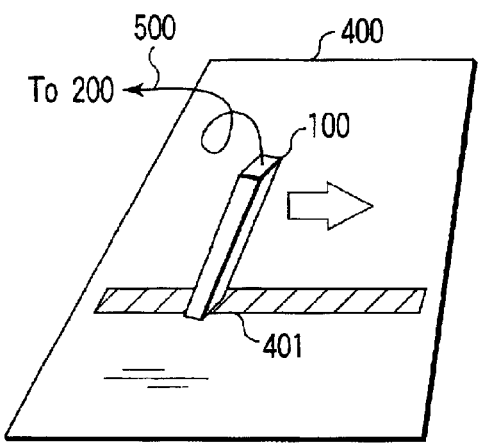
FIG. 20 is a schematic illustration of a recording medium and the code reading apparatus main body, illustrating a manual operation of holding the code reading apparatus main body and scanning the recording medium.

Alternatively, it may be so arranged that the code 401 is recorded on a sheet-shaped recording medium 400 and the operator holds the pen-shaped code reading apparatus main body 100 that is connected to the application program storing cartridge 200 by way of a cable 500 and moves it along the code 401, as shown in FIG. 20, in order to pick up the code 401 in an image pickup region (not shown) arranged at the top of the main body 100.

When the code is manually scanned in the manners as described above, the following additional information can also be acquired.

Figure 21:
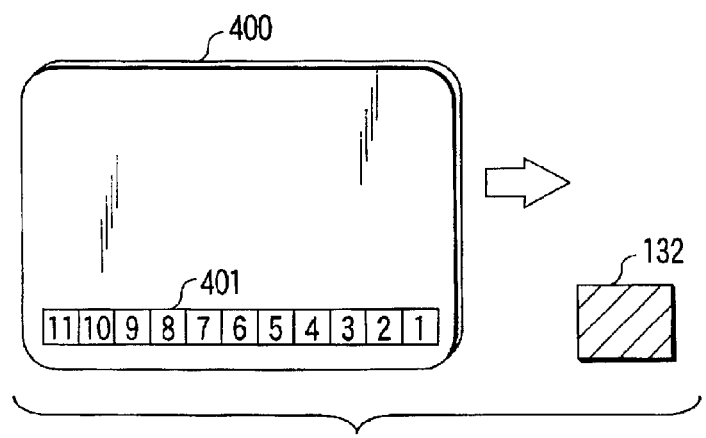
FIG. 21 is a schematic illustration of the relationship between the code recorded on a recording medium and an image pickup region.

When a code 401 that contains address information as described above by referring to FIG. 13 or 14 and in which addresses are arranged sequentially as shown in FIG. 21 is scanned relative to the image pickup region 132 of the code reading apparatus main body 100, a speed parameter can be obtained as relative movement information. With this arrangement, when an image as shown in FIG. 22 is obtained by an image pickup operation and an image as shown in FIG. 23 is obtained by a subsequent image pickup operation, the amount of relative movement of the code is obtained by the positions of the positioning indexes or the address information in a manner as illustrated in FIG. 24. Then, the relative moving speed of the code can be calculated from the amount of relative movement and the time interval of the two image pickup operations.

Additionally, an acceleration parameter can be obtained by differentiating the calculated relative moving speed.

When a code 401 that contains address information as described above by referring to FIG. 13 or 14 and in which addresses are arranged sequentially is scanned by means of the pen-shaped code reading apparatus main body 100 as shown in FIG. 25, a meandering parameter can be obtained as relative movement information. With this arrangement, when an image as shown in FIG. 26 is obtained by an image pickup operation and an image as shown in FIG. 27 is obtained by a subsequent image pickup operation, it is found that the code 401 moved relative to the image pickup region 132 in a manner as shown in FIG. 28. Therefore, as shown in FIG. 29, the amount of movement, or meander, between the two picked up images can be determined by comparing the positions of the positioning indexes or the addresses of the two picked up images.

When a code 401 that contains address information as described above by referring to FIG. 13 or 14 and in which addresses are arranged sequentially, it is also possible to obtain a parameter for the direction of relative movement or the number of times of relative movement of the code can be obtained as relative movement information. The direction of relative movement of the code can be determined by variation of the detected positions of the positioning indexes or by whether the addresses are detected in rising order or in falling order. Additionally, if addresses are detected in the order of "1, 2, 3, 4, 5, 6, 7, 8, 7, 6, 5, 4, 5, 6, 5, 6, 7, 8, 9, 10, . . ." as shown in FIG. 30, it is found that the code 401 is subjected to relative movement in a manner as indicated by the arrows in FIG. 30 sequentially in the order of the encircled numbers. In other words, the direction of relative movement and the number of times of relative movement of the code 401 can be obtained.

Parameters relating to the code reading apparatus can also be obtained in a manner as described below.

Figure 31:
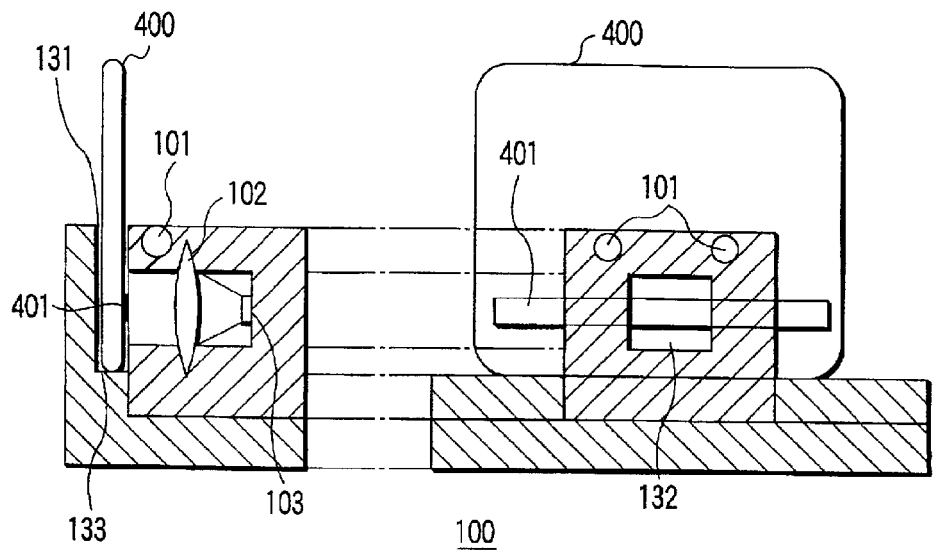
FIG. 31 is a schematic illustration of the positional relationship between the scanning guide and the image pickup device when they are assembled together.

When the code reading apparatus main body 100 is of the type illustrated in FIG. 19 and adapted to read the code 401 on the card-shaped recording medium 400 as the latter is moved in the slit 131, the illumination LED 101, the focusing lens 102 and the image pickup device 103 are arranged in such a way that the image pickup region 132 is located vis-a-vis the code 401 when the recording medium 400 is moved while it is being pressed against the bottom of the slit 131 operating as scanning guide 133 as shown in FIG. 31.

Figure 32:
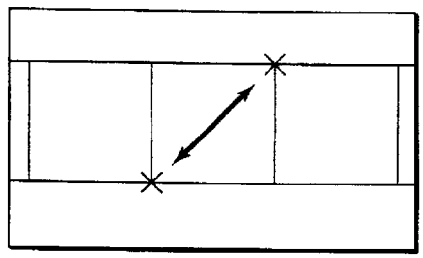
FIG. 32 is a schematic illustration of a method for acquiring a parameter relating to the magnification of a lens.
Figure 33:
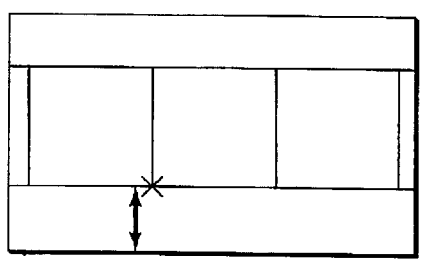
FIG. 33 is a schematic illustration of a method for acquiring a parameter relating to the position of the scanning guide.

Then, as shown in FIG. 32, a parameter relating to the magnification of the focusing lens 102 can be obtained from the picked up image typically by utilizing the information on the positions at which the code indexes 402 are read and detecting the length of the diagonals of the block of the code 401, provided that the size of the code 401 is given in advance.

A parameter relating to the position of the scanning guide 133 can be obtained by detecting the distance from an end of the picked up image to each of the code indexes 402.

Figure 34:
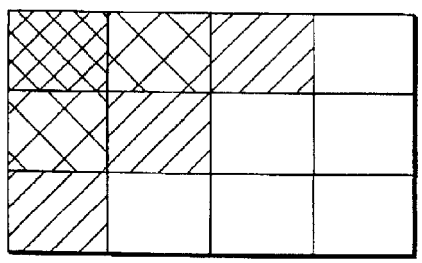
FIG. 34 is a schematic illustration of a method for acquiring a parameter relating to a liting condition.
Figure 35:
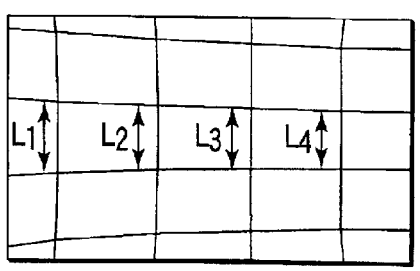
FIG. 35 is a schematic illustration of a method for acquiring a parameter relating the distortion of a focusing lens.

Similarly, a parameter relating to the lighting condition of the illumination LED 101 can be obtained by detecting brightness information (information on the average brightness of each predetermined area) as shown in FIG. 34 and a parameter relating to the distortion of the focusing lens 102 can be obtained by detecting the shape of the blocks of the code, the length and the width of the blocks for example, as shown in FIG. 35.

The types of parameters that can be detected by a code reading apparatus according to the invention and the methods for detecting parameters are described above. FIGS. 36A to 36C are views showing a table summarily showing effective parameters that can be used for providing randomness. More specifically, FIGS. 36A to 36C show detected pieces of information, parameters that can be acquired from the detected pieces of information and if each of the acquired parameters is effective as a "parameter relating to the code reading operation", "parameter relating to the way of reading the code", "parameter relating to the recording medium" and/or "parameter relating to the code reading apparatus".

The "parameter relating to the way of reading the code" as used herein refers to a parameter by which the outcome of a code reading operation as the parameter varies as a function of the manner how the operator operates if the recording medium is not changed. The "parameter relating to the recording medium" as used herein refers to a parameter by which the outcome of a reading operation can be controlled as a function of the recording medium recording the code. In other words, the outcome of the reading operation varies depending on the recording medium that is subjected to the reading operation if the reading operation is not changed. The "parameter relating to the code reading apparatus" as used herein refers to a parameter by which the outcome of a reading operation can be controlled as a function of the code reading apparatus. In other words, the outcome of the reading operation varies depending on the code reading apparatus that is used for the reading operation if the reading operation is not changed and the recording medium is not changed.

Thus, code reading environment parameters including those for temperature, humidity, time, position, atmospheric pressure, etc. are obtained by detecting the environment information. These parameters are particularly effective when used as "parameters relating to reading" or "parameters relating to the code reading apparatus". It is also possible to obtain parameters relating to the time required for the power source to rise to the normal power level and the supply voltage as environment information. Such parameters are particularly effective when used as "parameters relating to the code reading apparatus".

On the other hand, the parameters for the maximum brightness, the minimum brightness, the average brightness, the brightness distribution, the average brightness of the predetermined region, etc. are obtained by detecting the multi-value image information. These parameters can be used as "parameters relating to the way of reading the code" because they may represent the suspended condition and the inclination, if any, of pen-shaped code reading apparatus main body 100. They can also be used as "parameters relating to the recording medium" because some of them may represent the reflectivity of the recording medium 400. Furthermore, they can also be used as "parameters for the code reading apparatus" because they may represent the intensity of light and the shading of the illumination LED 101 and the sensitivity of the image pickup device 103. A parameter for the recording ink density of the code 401 can be obtained by calculating the ratio of the maximum brightness and the minimum brightness from the multi-value image information and the obtained parameter can be used as "parameter relating to the recording medium". Additionally, a parameter for the brightness of some of the components of the code, for example the brightness of the code indexes or that of the background, can be obtained from the multi-value image information. Such a parameter can be used as a "parameter relating to the recording medium" and/or "parameter relating to the code reading apparatus".

Threshold value parameters can be obtained by detecting the threshold information. Because such parameters vary, due to the recording ink density and the intensity of light of the code reading apparatus, they can be used as "parameters relating to the recording medium" and/or "parameters relating to the code reading apparatus".

On the other hand, parameters for the number of black pixels, that of white pixels, the ratio of white pixels to black pixels, etc. can be obtained by detecting the binarized image information. These parameters can be used as "parameters relating to the recording medium" because they depend on the design of the code and its surroundings. Particularly, the parameter for the number of black pixels can be used as a "parameter relating to the code reading apparatus" because it relates to the intensity of light and the shading of the illumination.

Furthermore, parameters for the detected positions of the code indexes (positioning indexes), the number of detected code indexes (positioning indexes), the size of the code indexes, the shape of the code indexes, the center of gravity/the geometrical center of the code indexes, the distance separating two neighboring code indexes (the size of the code and that of the block), the positional relationship of the code indexes (the shape of the code and that of the block), information on missing code indexes, etc. can be obtained by detecting the information on the positions, the number and the shape of the code indexes (positioning indexes). These parameters are particularly effective if used as "parameters relating to the code reading operation" and "parameters relating to the way of reading the code". Additionally, since the recording ink density and the magnification of the focusing lens 102 can vary, parameters for the detected positions, the size and the shape of the code indexes, the center of gravity/the geometrical center of the code indexes, the distance separating two neighboring code indexes, the positional relationship of the code indexes and the information on missing code indexes can be used as "parameters relating to the recording medium" and "parameters for the code reading apparatus".

Furthermore, parameters for the addresses and, if the addresses are provided with an error correction code, parameters for the number of corrected address errors (missing address data), the positions of the corrected address errors, and addresses missing information can be obtained by detecting the address information. Address parameters may include one indicating if address "10" is detected or not or one indicating the number of the frame where address "10" is detected (the elapsed time in ms after the start of the code reading operation). Such address parameters can be particularly effective if used as "parameters relating to the code reading operation" and "parameters relating to the way of reading the code". The parameter for the number of corrected address errors (missing address data) represents information on the number of address errors and varies depending on the scanning speed, the meandering of the code reading apparatus and/or the stains on the recording medium and hence can be used as "parameter relating to the code reading operation", "parameter relating to the way of reading the code" and/or "parameter relating to the recording medium". The parameter for the positions of the corrected address errors represents information on the address errors, if any, and hence can be used as a "parameter relating to the recording medium". The parameter for information on missing addresses represents that are missing probably because the way of reading the code was wrong, the state of the recorded code was bad, the focusing lens 102 was smeared and/or the image pickup device 103 was defective and hence can be used as "parameter relating to the code reading operation", "parameter relating to the way of reading the code", "parameter relating to the recording medium" and/or "parameter relating to the code reading apparatus".

Parameters for the positions at which data are to be read, the number of black dots, the number of white dots, the ratio of black dots to white dots, the data length, the number of read blocks, etc. are obtained from the code data information. These parameters represent the recorded code, so they are effective when used as "parameters relating to the recording medium". Since the code reading apparatus can meander, the parameter for the positions at which data are to be read can effectively be used as a "parameter relating to the code reading operation" and/or "parameter relating to the way of reading the code". Additionally, the parameter for the number of read blocks can be used as "parameter relating to the code reading operation" and/or "parameter relating to the way of reading the code" because all the blocks may not be read when the scanning speed is too high.

When the demodulated data information is detected, parameters respectively representing the number of "1"s, that of "0"s and the ratio of "1"s/"0"s can be obtained. These parameters are particularly effective when used as "parameters relating to the recording medium" because they are produced from the code.

On the other hand, when the error correction information is detected, parameters for the number of corrected errors (missing data) and the positions of corrected errors can be obtained. Since the parameter for the number of corrected errors (missing data) can vary depending on the scanning speed and the condition of the recording medium, it can effectively be used as a "parameter relating to the code reading operation", "parameter relating to the way of reading the code" and/or "parameter relating to the recording medium". The parameter for the positions of corrected errors can vary significantly depending on the recording condition of the code, so it can be effectively used as the "parameter relating to the recording medium".

When the restored information is detected, parameters for the ID, the producer (the person who prepared the code), the type of information, the recording time, the amount of data, etc. can be obtained. Since these parameters vary depending on the information recorded as the code, they can be effectively used as "parameters relating to the recording medium".

When the relative movement information is detected, parameters for the moving speed, the moving direction, the number of movements, etc. can be obtained. These parameters are particularly effectives as "parameters relating to the code reading operation" and "parameters relating to the way of reading the code". Parameters for meandering movements can also be obtained and effectively used as "parameters relating to the code reading operation" and "parameters relating to the way of reading the code" when a pen-shaped code reading apparatus main body 100 is used. Furthermore, the parameters for meandering movements can effectively used as "parameters relating to the recording medium" when a code reading apparatus main body 100 of the type for reading the code by receiving a card-shaped recording medium 400 in slit 131 is used because such meandering movements can be caused by cutting errors of the cut edges of card-type recording medium 400 and as "parameters relating to the code reading apparatus" because such meandering movements can be caused by assembling errors of the scanning guide 133 that is to be held in contact with the cut edges of card-type recording medium 400 and the image pickup device 103.

It is also possible to obtain a parameter for the time period from the time the operation button 110 is operated or a command is input in response to the detection of a recording medium by the recording medium sensor 111 to the time a predetermined position of the code is obtained. Such a parameter can be used as "parameter relating to the code reading operation" and "parameter relating to the way of reading the code".

It should be noted that each circle in FIGS. 36A to 36C indicate that the detected information relating to the circle is particularly effective for that parameter and the information may also be used as a "parameter relating to the code reading operation", "parameter relating to the way of reading the code", "parameter relating to the recording medium" and/or "parameter relating to the code reading apparatus" if no circle is shown for the information.

A masking card as shown in FIG. 37 may be used as a "parameter relating to the way of reading the code".

A plurality of masking cards 400M that are identical in terms of dimensions and shape are provided with a slot 411 arranged at a position corresponding to the data code 401D on the card-shaped recording medium 400 and a control code 401C recorded at a side of the slot 411. The control codes 401C of all the masking cards 400M are identical in terms of size and position so that the masking cards 400M are not discriminable to the operator.

Furthermore, a plurality of data cards 400D are prepared so as to carry data codes 401D that are different from each other and adapted to be used with a masking card 400M for selectively using the information contained in the data code 401D, although all the printed data codes 401D of different data cards 400D are identical in terms of configuration of code blocks and position.

Then, as shown in FIG. 38, a selected masking card 400M is laid on a data card 400D carrying the desired information for a code reading operation. As the control code 401C and the data code 401D are read, the blocks to be read from the data code 401D for retrieving information are determined according to the control code 401C.

For example, when only the data code 401D is read by the code reading apparatus as shown in FIG. 39, only block Z of the data code 401D is actually read and then a message "Please lay a masking card on the data card" may be displayed and/or sounded as a result of reading the block Z. As a masking card 400M carrying a control code 401C, that is, control code "A", is laid on the data code 401D for the code reading operation of the code reading apparatus, only block "A" of the data code 401D is read by the apparatus.

Thus, the output of the code reading apparatus varies according to the combination of masking card and data code.

Now, how the outcome of a code reading operation is provided with randomness by such randomness providing means will be discussed below.

Assume that the above embodiment of the code reading apparatus is that of an entertainment system.

Referring to FIG. 40, the program processing apparatus 300 is provided as a portable game machine main body that is contained a low-profile housing 311, and the operating section 305 and the LCD 306 of the program processing apparatus 300 are exposed at a main surface (shown in FIG. 40) of the housing 311. The housing 311 is provided at an upper position of the rear side thereof with an insertion slot 312 for receiving an application program storing cartridge 200 that is a game cartridge. On the other hand, the application program storing cartridge 200 that is a game cartridge is integrally formed with the code reading apparatus main body 100 that is arranged at the rear side of the cartridge opposite to the side that is led into the insertion slot 312. When the cartridge 200 is loaded into the program processing apparatus 300 that is the game machine main body, the slit 131 for receiving the recording medium 400 is exposed from the top of the housing 311.

Figures 41, 42:
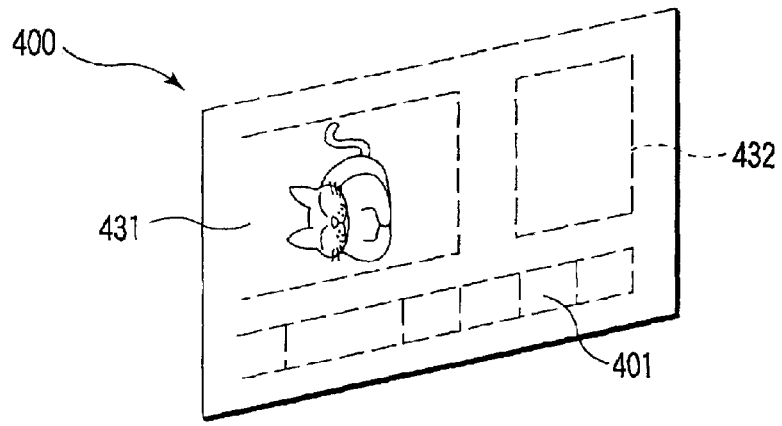
FIG. 41 is a schematic illustration of a recording medium to be used as a playing card.
FIG. 42 is a schematic illustration of a logical format of a code.

On the other hand, the recording medium 400 is provided as a playing card as shown in FIG. 41 that carries, on one of the main surfaces thereof, a graphic display region 431, a power data storage region 432 and an optically readable code 401 operating as data.

If the recording medium 400, or the playing card, has an oblong rectangular profile, the graphic display region 431 is arranged in the upper half of the card or in an upper half area larger than a half of the entire surface area of the card, and a character image of an animal, a person or an imaginary monster may be printed there. The kind, design or pattern of the character image printed in the graphic display area 431 may vary from card to card in order to represent the characteristic of the playing card. It may be an image of a character (a character of the protagonist, a character of the party or the adversary or any character whose image can be an object of collection) that appears on the game screen when the game program stored in the program ROM 201 of the application program storing cartridge 200 is executed. A number of such playing cards (e. g., 30 to 40 cards) may be collected into a set (which is referred to as a "starter kit"), each carrying, with arbitrary probability, an image of a funny or cute character that is an object of collection, and put up for sale with or without the code reading apparatus main body 100 and application program storing cartridge 200. A set of duplicates of a small number of different cards (which is referred to as "expansion pack") may also be put up for sale. When the code reading apparatus main body 100 and the application program storing cartridge 200 are provided separately, the starter kit may be sold with the application program storing cartridge 200.

The power data storage region 432 is used to display power data (also referred to as attribute data) of the character shown in the graphic display region 431. The power data are visually (recognizably) expressed by using printed letters, symbols and/or numerals. They may include: the name and number of the character; the weapons and/or the magical techniques that the character can use; and the strength, the power, the hit-point and the offensive and defensive capabilities of the character as expressed by letters, symbols and/or numerals. If necessary, a symbol indicating the value of the recording medium 400 showing the character (rareness mark) may also be printed in the power data storage region 432.

The code 401 is arranged at least along a side of the recording medium 400 operating as playing card in a less remarkable way. The code 401 may be arranged along two opposite sides of the recording medium 400 without overlapping the graphic display region 431 and the power data storage region 432 or alternatively along three or four sides of the recording medium 400 so as to surround the graphic display region 431 and the power data storage region 432. The data recorded as code 401 include: power data described in the power data storage region 432 including the identification code of the character and data on the techniques, the weapons and other features that can be used for the game as expressed in terms of words and/or sentences (or texts); and additional data (e. g., sound data and dot data or graphic data showing the character).

It may be appreciated that such power data and additional data may be selectively used depending on the game to be played. The additional data may include sound data that may be the voice of the character, if the character is a human being, or the crying or roaring sound of the character, if the character is an animal or a monster, and additional power data other than the visually recorded power data (items with which the character can exert magical power and/or hidden power that makes the character invincible for a predetermined period of time).

For example, if the game is that of capturing or raising an imaginary monster, an image of the monster is drawn in the graphic display region 431 and the data (power data and/or additional data) recorded as code 401 include data on the skills of the monster, the roaring sound of the monster, data on the evolving monster, explanation data describing the characteristic aspects of the monster as expressed in terms of words and/or sentences (letters or texts) and data translated the explanation data. If the game is that of a sports game including a baseball or soccer match game and the character is a (baseball or soccer) player, a photographic image of the character is shown in the graph display region 431 and the data recorded as code 401 include the team name, the uniform number and the age of the player as well as the achievement data of the player (the batting average, the number of home runs, the RBIs, the number of steals and running ability if the player is a baseball field player, the earned run average, the number of strikeouts and the given runs if the player is a baseball pitcher, the physical potential, the number scores and the number of assists if the player is a soccer player). If the game is a role playing game or an action game, the character is a person, an animal or an imaginary living thing and the data recorded as code 401 may include data expressing characteristic properties including data on the life, the power and the potential of the character as well as the items that the character can use (weapons, protectors, magic, etc.)

If a mini-game is played by combining and using a plurality of playing cards, or recording mediums 400, it is possible to divide the program for mini-game and make the playing cards, or the recording mediums 400, record the parts produced by dividing the program along with sequence data as code 401. In such a case, a plurality of different programs may be prepared for the mini-games so that the program part recorded on the playing card as code 401 may be decided depending on the kind of the playing card (the kind of monster (Water type, Fire type, Grass type, etc.)).

A plurality of different data may be appropriately combined and recorded as code 401.

As shown in FIG. 42, in the code 401, the attributes for determining the type and amount of data and the card ID for identifying the recording medium 400 may be recorded as a header so that the data of each type of recorded data may be identified and reflected onto the electronic game.

Such recording mediums 400 may be collected as playing cards (trading cards) because of the charm of the graphic images printed on the respective graphic display regions 431 of the cards. Furthermore, the cards may be used for a card game by utilizing the information recorded in the power data recording region 432.

Now, an example where the electronic game is that of capturing or raising an imaginary monster and an image of the monster printed on the recording medium 400 as a playing card appears in the electronic game will be described below.

Then, the program ROM 201 of the application program storing cartridge 200, or the game cartridge, stores a program adapted to modify the electronic game by using the data read from the code 401 of the recording medium 400 as a playing card and at least one of the "parameters relating to the code reading operation", the "parameters relating to the way of reading the code", the "parameters relating to the recording medium" and the "parameters relating to the code reading apparatus" obtained in a manner as described above. If the data expressing characteristic properties represent items that enhance the potential of the character (weapons, magical techniques, etc.), the program ROM 201 may store a program that allows the character to use one or more than one of the items as selected on the basis of the parameters. If the data expressing characteristic properties represent a dot (graphic or image) data of a character other than the character who figure in the game, the program ROM 201 may store a program for animating dot (or graphic) data of the character as read from the recording medium 400, or the playing card, in various different ways and a process for animating the dot data may be selected on the basis of the parameters. If, on the other hand, the data expressing characteristic properties are those prepared by dividing a program for a number of mini-games on a predetermined data unit basis and stored in a number of recording mediums 400, or playing cards, the program ROM 201 may store a control program with which one of the mini-programs is selected on the basis of the parameters, parts of the selected mini-game are read from the recording mediums 400 and assembled together according to a predetermined sequence for the purpose of playing the mini-game and the assembled mini-game is executed.

Figure 43:
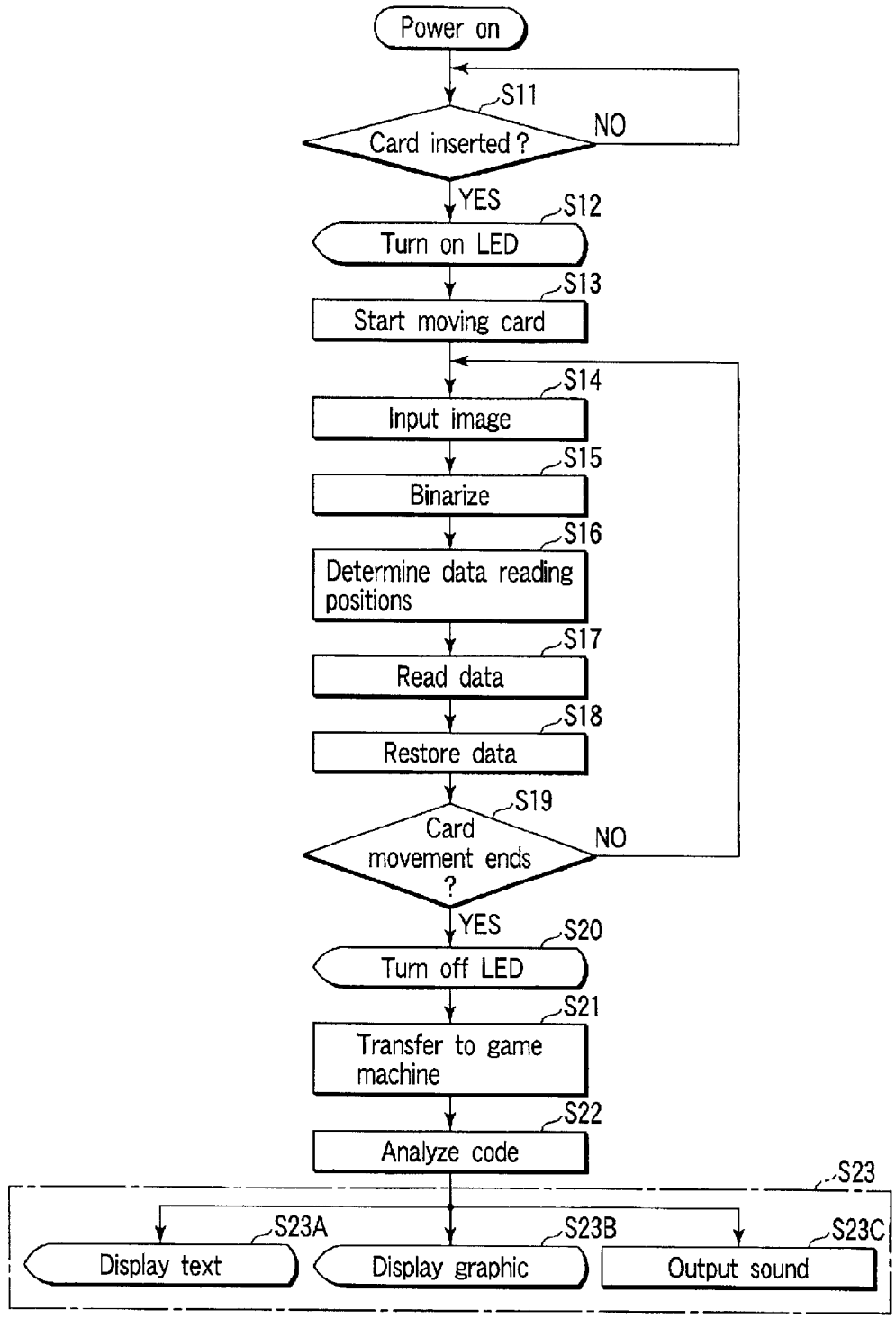
FIG. 43 is a flow chart of the operation of an entertainment system.

FIG. 43 is a flow chart of the operation of such an entertainment system.

Referring to FIG. 43, as the power switch (not shown) of the program processing apparatus 300, or the portable game machine main body, is turned on, the CPU 107 of the code reading apparatus main body 100 starts operating according to the program stored in the system ROM 112. Firstly, it determines if an insertion of a recording medium 400, or a playing card, is detected or not according to the output of the medium sensor 111 (or instruction information by operating the operation button 110 is input or not) (Step S11). If no card insertion is detected, it is held in a standby state until the medium sensor 111 detects a recording medium 400, or a playing card.

As a recording medium 400, or a playing card, is inserted into the slit 131, the medium sensor 111 detects the recording medium 400, or the playing card. Then, in response to the detection, the CPU 107 drives the illumination LED 101 to turn on (Step S12). Then, the operator moves the recording medium 400 so as to make the edge thereof where a code 401 is arranged slide on the scanning guide 133 at the bottom of the slit 131 (Step S13). The CPU 107 sequentially operates the image pickup device 103 so as to shoot the code 401 on the recording medium 400 (Step S14) and pick up an image thereof, then the binarization circuit 105 so as to binarize the outcome of the image pickup operation and subsequently the binarization memory 106 so as to store the binarized image (Step S15). Thereafter, as pointed out earlier, it determines the positions at which the data are to be read on the basis of the binarized image (Step S16) and the data at those positions are actually read (Step S17) so that the original data are restored (Step S18) and stored in the data RAM 202 of the application program storing cartridge 200, or the game cartridge. The parameters obtained in the course of carrying out the above steps are also stored in the data RAM 202.

Then, it is determined if the movement of the recording medium 400, or the playing card, is terminated or not (or the input of the instruction information by the operation of the operation button 110 is disappeared or not) (Step S19). If it is found that the medium sensor 111 is still detecting the recording medium 400, the CPU returns to Step S14 to repeat the Steps S14 through S19 until the recording medium 400 is no longer detected. In other words, the Steps S14 through S19 are repeated until the data of all the blocks recorded as code 401 are read.

When it is found in Step S19 that the movement of the recording medium 400, or the playing card, is terminated, the illumination LED 101 is turned off (Step S20). Then, the data read from the recording medium 400 as a sheet of the playing card, and the parameters obtained in the course of the above data reading operation that are stored in the data RAM 202 are sequentially read out by the CPU 302 of the program processing apparatus 300, or the code reading apparatus main body, and temporarily stored in the RAM 304 (Step S21). Thereafter, the CPU 302 analyzes the data read out and stored in the RAM 304 (Step S22) and carries out a processing operation for the game program that is being executed properly in order to provide it with randomness that reflects the read out and analyzed data according to the read out and analyzed data and the program stored in the program ROM 201 of the application program storing cartridge 200, or the game cartridge (Step S23). If the data recorded as code 401 is text data, the letters or the sentences read out from the code 401 are displayed on the LCD 306 and the processing operation for providing randomness may be such that the font may be changed and/or some of the words may be inflected according to the parameters (Step S23A). If the data recorded as code 401 is graphic (or dot) data for displaying a character, the graphic data is displayed on the LCD 306 and the processing operation for providing randomness may be such that the intervals separating the graphic data may be changed according to the parameters (Step S23B). If the data recorded as code 401 is sound data for a roaring sound of the monster, the sound data is D/A converted and output from the audio output section 307 as sound and the processing operation for providing randomness may be such that the duration of the sound output may be changed according to the parameters (Step S23C).

Now, how randomness is provided according to the parameters will be described in greater detail by way of an example where the parameter for the number of corrected errors is used.

Assume that, as shown in FIG. 42, the recording medium 400, or the playing card, bears data written in a logical format as code 401 and the data read out from the code 401 is corrected for errors if it contains errors, so that it is warranted that the data may be correctly and reliably read out unless they contain errors excessively.

The data section contains image data and, if the image data are provided with an animation pattern as an additional factor of image data, an animated image is displayed on the LCD 306 according to the animation pattern. The number of corrected errors (error rate) as detected at the time of reading the code 401 from the recording medium 400 is told by the CPU 107 to the CPU 302 by way of the data RAM 202 and the RAM 304.

Additionally, as shown in FIG. 44, the program ROM 201 of the application program storing cartridge 200, or the game cartridge, stores combinations of error rates and animation patterns. If animation pattern [0] is a weak animation and animation patterns [1], [2], [3], . . . become stronger in an ascending order, a game where the character grows stronger as the card is used more often will be realized.

Figure 45:
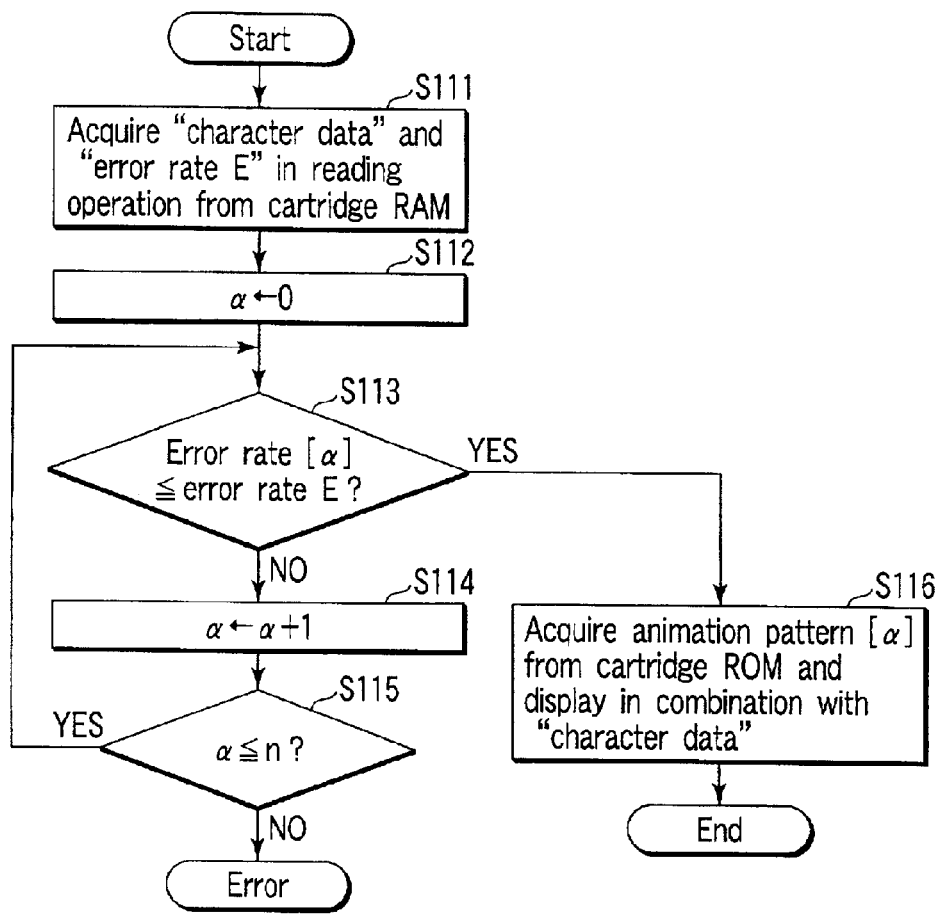
FIG. 45 is a flow chart of an operation of the CPU of a program processing apparatus operating as portable game machine main body in the entertainment system.

When the program ROM 201 stores such animation patterns, the CPU 302 of the program processing apparatus 300, or the portable game machine main body, produces animation in a manner as shown in the flow chart of FIG. 45 according to the game program stored in the program ROM 201 of the application program storing cartridge 200, or the game cartridge.

Referring to FIG. 45, the CPU 302 reads out the character data that are read from the code 401 and the error rate E, which is a parameter acquired in the course of the processing operation for obtaining the character data, from the data RAM 202 of the application program storing cartridge 200 and stores them in the RAM 304 in a step corresponding to the above described Step S21 (Step S111). It will be appreciated that, in this example, the operation of analyzing the read out data in Step S22 is omitted because it is known that the data that are read from the code 401 are character data according to the information stored in the program ROM 201.

Then, the CPU 302 sets "0" in an internal counter a (not shown) as initial value (Step S112) and subsequently compares the error rate [α] shown on the internal counter α and the error rate E stored in the RAM 304 to see if the error rate E is not smaller than the error rate α or not (Step S113).

If the error rate E is smaller than the error rate α, the CPU 302 raises the reading of the internal counter α to "+1" (Step S114). Then, it determines if the reading of the internal counter α after "+1" is set has exceeded the number n of combinations of error rates and animation patterns stored in the program ROM 201 or not (Step S115) and, if it is found that the reading has not exceeded the number n, it returns to Step S113. If, on the other hand, it is found that the reading has exceeded the number n, it displays the error display and/or outputs an error notifying sound in a predetermined manner.

If it is found that the error rate E is not smaller than the error rate [α], YES is replied to the question of Step S113 and the animation pattern [α] corresponding to the error rate [α] is read out from the program ROM 201 of the application program storing cartridge 200 and displayed with the character data stored in the RAM 304 to display an animated image (Step S116).

In this way, while a single set of character data is read out from the code 401 on the recording medium 400, or the playing card, they are animated in one of different ways as one of the animation patterns is selected according to the detected error rate E.

Animation can be realized by the game program itself without providing animation patterns as shown FIG. 44. If such a case, the CPU 302 operates according to the game program stored in the program ROM 201 in a manner as shown in FIG. 46.

Referring to FIG. 46, the CPU 302 reads out the character data that are read from the code 401 and the error rate E that is a parameter acquired in the course of the processing operation for obtaining the character data from the data RAM 202 of the application program storing cartridge 200 and stores them in the RAM 304 (Step S121).

Then, it compares the error rate E stored in the RAM 304 with two error rate constants β1, β2 given by the game program stored in the program ROM 201 (Step S122).

If the error rate E is not greater than the first error rate constant β1, the animation 1 subroutine of the game program stored in the program ROM 201 is executed (Step S123) and the first animation is displayed by using the character data stored in the RAM 304.

If, on the other hand, the error rate E is greater than the first error rate β1 but not greater than the second error rate β2, the animation 2 subroutine of the game program stored in the program ROM 201 is executed (Step S124) and the second animation is displayed by using the character data stored in the RAM 304.

Finally, if the error rate E is greater than the second error rate β2, the animation 3 subroutine of the game program stored in the program ROM 201 is executed (Step S125) and the third animation is displayed by using the character data stored in the RAM 304.

In this way, while a single set of character data is read out from the code 401 on the recording medium 400, or the playing card, they are animated in one of different ways as one of the motions of the program is selected according to the detected error rate E.

Figure 47:
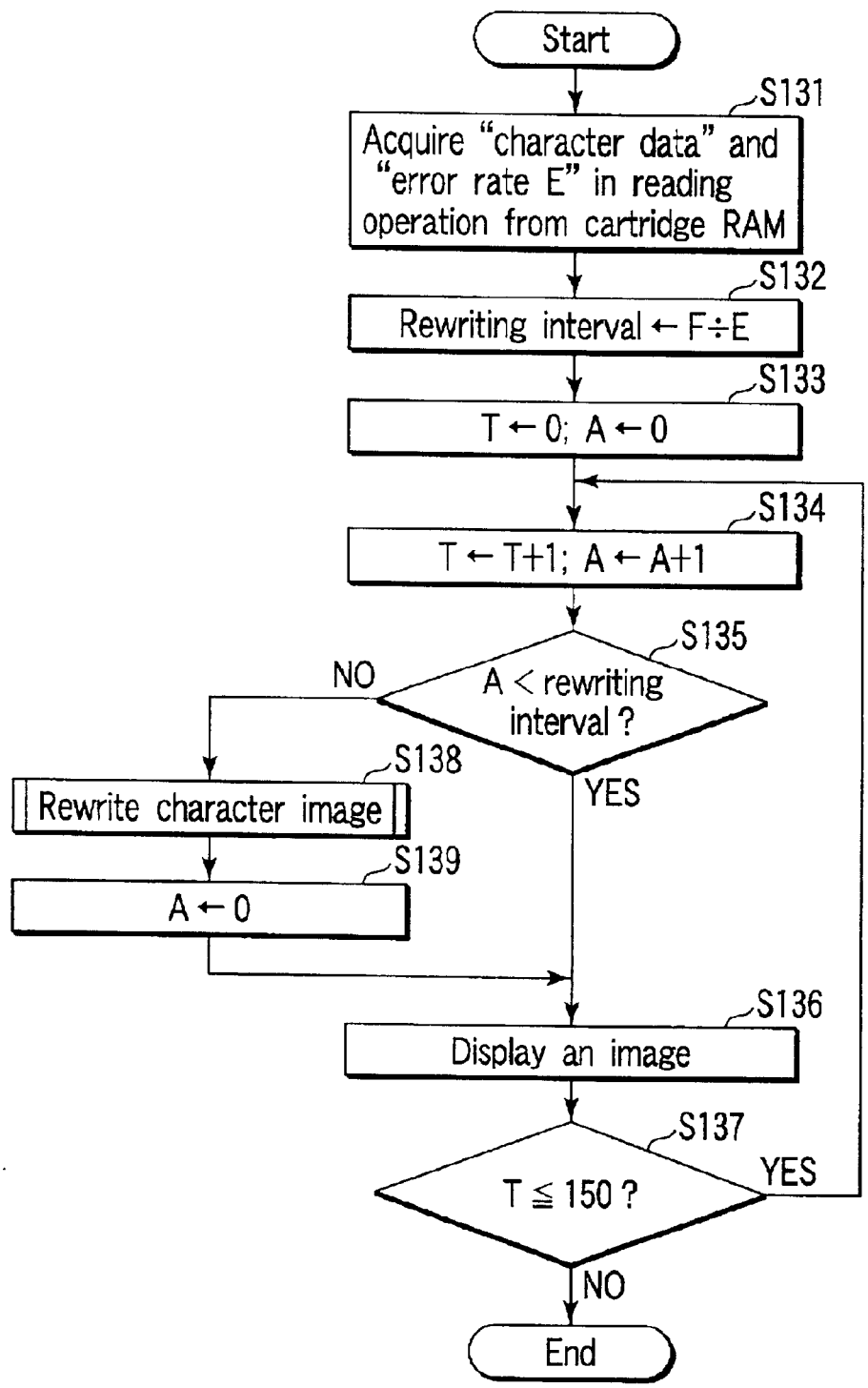
FIG. 47 is a flow chart of still another operation of the CPU of the program processing apparatus.

It is also possible to change the moving speed of the animated figure, or the frame rate of the animation being displayed, as a function of the error rate E, as shown in FIG. 47.

Referring to FIG. 47, firstly, the CPU 302 reads out the character data read from the code 401 and the error rate E that is a parameter acquired in the course of the processing operation for obtaining the character data from the data RAM 202 of the application program storing cartridge 200 and stores them in the RAM 304 (Step S131).

Then, it divides the constant F given from the game program stored in the program ROM 201 by the error rate E stored in the RAM 304 and stores the quotient in the internal register as a rewriting interval (Step S132). It sets the initial reading of the internal counter T to "0" and also that of the internal counter A to "0" (Step S133).

After that, the CPU 302 raises the internal counter T to "+1" and raises the internal counter A to "+1" (Step S134). Then, it determines if the reading of the internal counter A is smaller than the rewriting interval stored in the internal register (Step S135).

Thereafter, if the reading of the internal counter A is smaller than the rewriting interval, it displays a screen image by using the character data stored in the RAM 304 (Step S136). Subsequently, it determines if the reading of the internal counter T is not smaller than 150 or not (Step S137) and, if not, it returns to Step S134.

If, on the other hand, it is determined in Step S135 that the reading of the internal counter A is not smaller than the rewriting interval, the CPU 307 rewrites the image of the character data stored in the RAM 304 (Step S138). Then, after resetting the internal counter A to "0" (Step S139), the CPU 302 proceeds to Step S136, where it displays a screen image by using the rewritten character data.

In this way, the above steps of processing operation are repeated until the reading of the internal counter T in Step S137 exceeds 150.

In other words, the image is rewritten once every one thirtieth of a second and the rewriting interval indicate at which of the images produced by the rewriting operation conducted once every one thirtieth of a second the character data are modified. The rewriting interval is reduced as the error rate E raises so that the image is rewritten frequently and hence the image of the animation moves more quickly. In the flow chart, the processing operation ends after looping 150 frames, or 5 seconds.

In this way, while a single set of character data is read out from the code 401 on the recording medium 400, or the playing card, the operation of the program is modified by using the detected reading error rate E as program parameter and one of a plurality of animations is effected.

The animation pattern data or the program for the motions shown in the flow chart of FIG. 45, 46 or 47 may be stored in the code 401 on the recording medium 400 instead of the program ROM 201, and transferred to the RAM 304 by way of the data RAM 202 for operation. Then, the operation is same as that described above and only the program ROM 201 needs to be replaced by the data RAM 202 as shown in parenthesis in FIG. 44.

When the animation pattern data or the program is recorded as part of the code 401, the code 401 may occupy a relatively large region on the recording medium 400. Then, the remaining regions including the graphic display region 431 and the power data recording region 432 may need to be made relatively small. However, regardless of this disadvantage, this arrangement is highly advantageous in that the animation pattern or the program is not limited to it stored in the program ROM 201 of the application program storing cartridge 200, or the game cartridge, and can be variously changed by changing the data stored as part of the code 401 to make the entertainment, or the game, highly flexible.

The parameter of the error rate may be used in a different way as described earlier to provide the outcome of reading the code with randomness.

As described above in detail, this first embodiment provides an advantage that the outcome of reading a code is same if condition including a recording medium, a operator, a code reading apparatus, or a code reading environment is same and identical, and a various outcomes with randomness are obtained if the condition is not same and identical.

For example, in an entertainment system of using trading cards to be collected by collectors, the cards carrying an optically readable code to be read so as to display an image obtained by code reading operation on a display, it is a known method to make the program generate a random number each time a code is read and modify the game according to the random number, in order to diversify the game. However, with this method, while the game may be diversified easily because the program is modified, anybody can reproduce a certain displayed image in time by repeating the reading operation of the code. Then, the game quickly becomes boring. On the other hand, a certain displayed image cannot be reproduced repeatedly if they are based on a random number. In other words, the code reading operation needs to be repeated for a huge number of times in order to reproduce a same image to frustrate the user.

On the other hand, the codes printed on cards may vary due to the printing operation, and missing data may occur due to stains or degradation of the print. Additionally, the code reading apparatuses may vary mechanically and electronically, due to the manufacturing process, therefore, the code reading apparatus may exhibit different characteristics from apparatus to apparatus in terms of values selected for regulating the unevenness and for reading operations. Furthermore, the environmental conditions upon a reading operation may vary from apparatus to apparatus in terms of ambient temperature and external light entering the code reading apparatus. Still further, the way the card is moved through the code reading apparatus, in terms of direction, speed and hand waggling, as well as the sequence a plurality of cards are inserted if a plurality of cards are used, may vary from user to user.

The above described embodiment utilizes these characteristics that become available in the operation of reading the code, in order to provide the game with randomness, so that the entertainment system may change in various ways. In other words, the entertainment system is provided with changes particular to the system by utilizing the differences in the card, the code reading apparatus, environmental conditions and operators to make the system really enjoyable.

Some of the advantages of the embodiment are listed below.

1: Trading cards are an object of collection and exchange. The owners of such cards can also enjoy exchange of information concerning such cards. This embodiment can produce various different outcomes from a single operation of reading the code printed on a card by utilizing variances attributable to the code. In other words, cards carrying the same code may vary from card to card so that the enjoyment of exchanging and collecting cards can be greatly enhanced.

2: The entertainment system can be so arranged that the outcomes of a single operation of reading the codes printed on cards vary from card to card depending on the size of the dot codes and the brightness information. Then, the printing effect and the density of ink at the time of printing a code may be positively and easily varied to produce cards that are different from each other in terms of effects of operation, without raising the printing cost and changing the form plate.

3: This embodiment can produce diverse outcomes by utilizing variances in the code reading apparatus. In other words, the code reading apparatus of a user may perform differently from that of his or her friends. Then, the user can have his card read by the code reading apparatus of the friend and vice versa to enjoy the outcomes by comparing them. If the code reading apparatuses are provided with a telecommunications feature, the outcome of the operation of the friend's apparatus of reading his or her own card can be stored in his or her own apparatus.

4: This embodiment utilizes the habits of the user in using the code reading apparatus to read a card. Therefore, the outcome of an operation that the code reading apparatus read the code printed on a card may vary from person to person. For example, a monster drawn on a card is animated, so as to perform an action. The action may vary depending on the person who uses the card. Thus, phenomena such as "my friend's monster is slow but mine is quick" may appear. Then, the user may feel a strong affinity for his or her own monster.

5: This embodiment utilizes differences in environmental conditions of the operation of making the code reading apparatus read the code printed on a card, therefore, different outcomes may be produced depending on the environmental condition. For example, an animal such as a mole may not appear if the code is read in an environment where external light is rich. Similarly, if types of the monster include icy type, fire type, grass type, etc., the icy type monster may become strong when the location identified by a GPS is somewhere in the cold region or the observed temperature is very low.

6: With this embodiment, the entertainment system can be so designed as to make the card more powerful in initial stages, thereafter, weaker as the amount missing data by errors increases. Since the amount of missing data increases as the card is used, the animated monster may become more powerful as the card is used in initial stages but subsequently turn to be weaker and weaker as a result of aging.

7: If the code data is not obtained because of some error, the game program may be so designed that the game can be played differently depending on the amount and the breakdown of the errors. Then, errors that normally frustrate the user can be utilized as a source of entertainment.

[2nd Embodiment]

Now, the second embodiment of the invention will be described below.

The above described first embodiment is so arranged as to provide randomness according to the programs acquired in the course of a code reading operation. However, if the highest speed or the average speed of a moving of the code reading apparatus main body 100 or the recording medium 400 that can be estimated by the user are used as parameters without modifications, they may give not impress the user.

Therefore, this second embodiment is designed to enhance the level of randomness.

Figure 48:
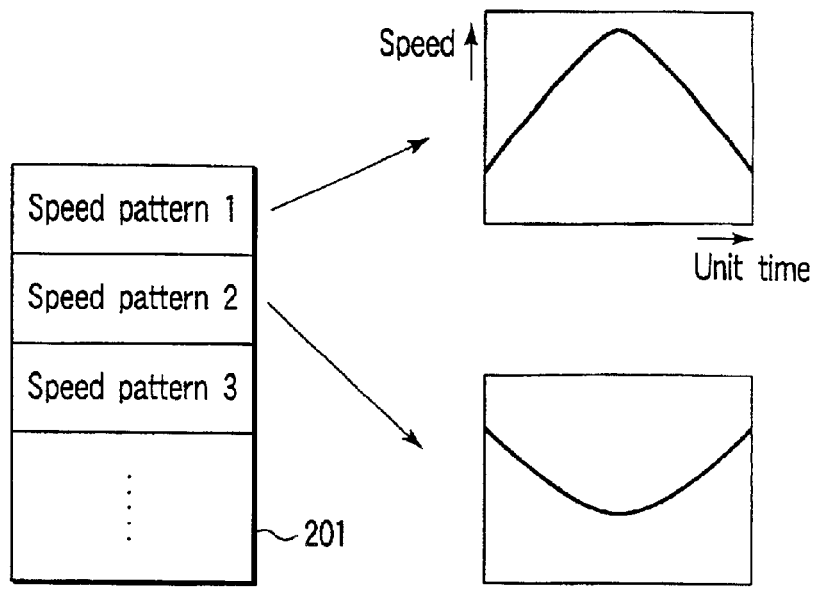
FIG. 48 is a schematic illustration of the data stored in the ROM of the application program storing cartridge of a code reading apparatus according to a second embodiment of the invention.
Figure 49:
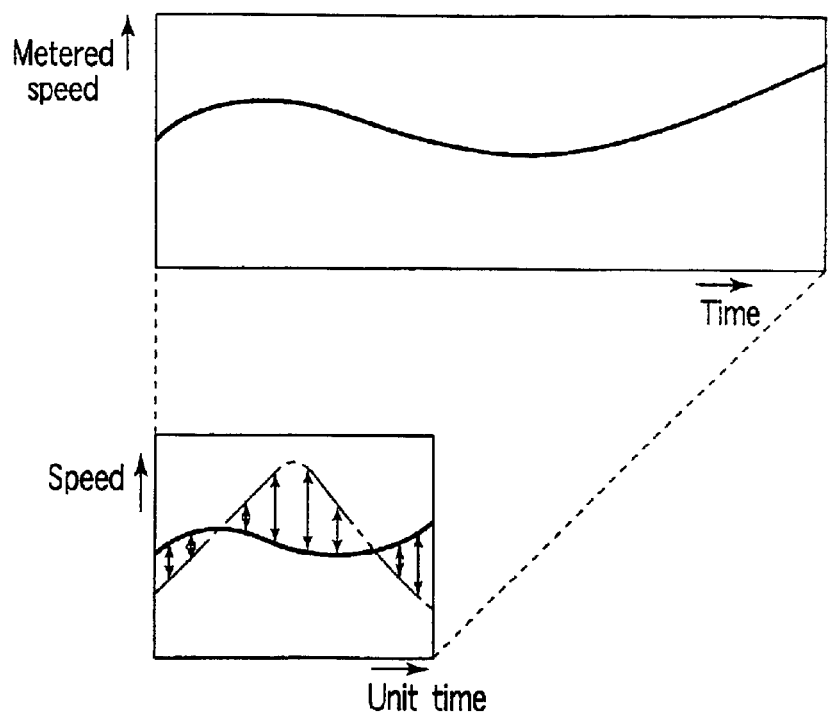
FIG. 49 is a schematic illustration of a method for acquiring a parameter relating the speed.

More specifically, the program ROM 201 of the application program storing cartridge 200, or the game cartridge, is made to store not the highest speed or the average speed of a moving but a number of speed patterns that show changes in the speed of the moving as shown in FIG. 48. Then, the observed pattern of the changing speed is normalized to show a unit time the same as that of the speed patterns stored in the program ROM 201 and checked for matching sequentially with the stored patterns so as to select the matching pattern as parameter as shown in FIG. 49.

Alternatively, as shown in FIG. 50, a table from which parameter values that are not in a rising order or a falling order can be obtained according to the observed speed range may be stored in the program ROM 201 of the application program storing cartridge 200, or the game cartridge. The table may alternatively be stored in the code 401.

It may be appreciated that the above described arrangement may be applied not only to speed parameters, but also to any other parameters.

Thus, this second embodiment can provide an enhanced level of randomness.

While the present invention is described above by referring to preferred embodiments, the present invention is by no means limited to those embodiments, which may be modified or altered in various ways without departing from the scope of the invention.

For example, while the program processing apparatus 300 of the above embodiments is described as a portable game machine provided with an LCD, the technological concept of the present invention is not limited thereto and the present invention is applicable to any video game machine or game that uses a personal computer. If this is the case, the data stored in the program ROM 201 of the application program storing cartridge 200, or the game cartridge, may be stored in the information storing medium of the video game machine, which may be a memory cartridge, a magnetic disk, a CD-ROM or a DVD (digital versatile disk) and the code reading apparatus main body 100 may be integrated with or externally connected to the game machine or the personal computer.

Additionally, while the above embodiments are described in terms of an electronic game of, for example, capturing and raising a monster, the technological concept of the present invention is by no means limited thereto and applicable to any game as long as it uses a playing card and an electronic game in combination.

Furthermore, there may be two or more identification codes of a character. If there are two or more types of card for the same character that illustrate different aspects of the character, the character may be provided with a plurality of identification codes.

Finally, the present invention is by no means limited to entertainment systems as in the case of the above described embodiments and may equally be applied to educational equipment or other systems.

Additional advantages and modifications will readily occur to those skilled in the art. Therefore, the present invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A code reading apparatus comprising:
   a reading section for optically reading an optically readable code from a recording medium on which data is recorded as the optically readable code;
   an output section for performing an output based on an outcome of a code reading operation of said reading section; and
   a randomness providing section for providing the outcome of the code reading operation of said reading section with randomness, so that the output of said output section, which is based on the outcome of said code reading operation, is varied by the randomness provided by said randomness providing section.

2. The apparatus according to claim 1, wherein said apparatus optically reads said code while one of said apparatus and said recording medium is held by hand.

3. The apparatus according to claim 2, wherein said apparatus optically reads said code while said apparatus and said recording medium are moved relative to each other.

4. The apparatus according to claim 1, wherein said randomness providing section includes a parameter detecting section for providing randomness to the outcome of the code reading operation by detecting parameters relating to the code reading operation.

5. The apparatus according to claim 4, wherein said parameter detecting section includes a providing section for providing randomness to the outcome of the code reading operation by detecting parameters relating to a way of reading the code.

6. The apparatus according to claim 5, wherein said providing section includes a parameter detecting section for providing randomness to the outcome of the code reading operation by detecting parameters relating to positions of predetermined components of said code.

7. The apparatus according to claim 5, wherein said providing section includes a parameter detecting section for providing randomness to the outcome of the code reading operation by detecting parameters relating to a number of components detected out of predetermined components of said code.

8. The apparatus according to claim 5, wherein said providing section includes a parameter detecting section for providing randomness to the outcome of the code reading operation by detecting parameters relating to a brightness of each of predetermined components of said code.

9. The apparatus according to claim 5, wherein said providing section includes a parameter detecting section for providing randomness to the outcome of the code reading operation by detecting parameters relating to a size of each of predetermined components of said code.

10. The apparatus according to claim 5, wherein said providing section includes a parameter detecting section for providing randomness to the outcome of the code reading operation by detecting parameters relating to a shape of each of predetermined components of said code.

11. The apparatus according to claim 5, wherein said providing section includes a parameter detecting section for providing randomness to the outcome of the code reading operation by detecting parameters relating to missing information on components missing from said read code.

12. The apparatus according to claim 5, wherein:
    said apparatus optically reads said code while one of said apparatus and said recording medium is held by hand and said apparatus and said recording medium are moved relative to each other, and
    said providing section includes a parameter detecting section for providing randomness to the outcome of the code reading operation by detecting parameters relating to a relative moving speed of said apparatus and said recording medium.

13. The apparatus according to claim 5, wherein:
    said apparatus optically reads said code while one of said apparatus and said recording medium is held by hand and said apparatus and said recording medium are moved relative to each other, and
    said providing section includes a parameter detecting section for providing randomness to the outcome of the code reading operation by detecting parameters relating to a meandering motion during the relative movement of said apparatus and said recording medium.

14. The apparatus according to claim 5, wherein:
    said apparatus optically reads said code while one of said apparatus and said recording medium is held by hand and said apparatus and said recording medium are moved relative to each other, and
    said providing section includes a parameter detecting section for providing randomness to the outcome of the code reading operation by detecting parameters relating to directions of relative movement of said apparatus and said recording medium.

15. The apparatus according to claim 5, wherein:
    said apparatus optically reads said code while one of said apparatus and said recording medium is held by hand and said apparatus and said recording medium are moved relative to each other, and
    said providing section includes a parameter detecting section for providing randomness to the outcome of the code reading operation by detecting parameters relating to a number of times of relative movement of said apparatus and said recording medium.

16. The apparatus according to claim 4, wherein said parameter detecting section includes a providing section for providing randomness to the outcome of the code reading operation by detecting parameters relating to an environment of said code reading operation.

17. The apparatus according to claim 1, wherein said randomness providing section includes a providing section for providing randomness to the outcome of the code reading operation by detecting parameters relating to said recording medium.

18. The apparatus according to claim 17, wherein said providing section includes a parameter detecting section for providing randomness to the outcome of the code reading operation by detecting parameters relating to a positional relationship of predetermined components of said code.

19. The apparatus according to claim 17, wherein said providing section includes a parameter detecting section for providing randomness to the outcome of the code reading operation by detecting parameters relating to a recording density of said code.

20. The apparatus according to claim 17, wherein said providing section includes a parameter detecting section for providing randomness to the outcome of the code reading operation by detecting parameters relating to a size of said code.

21. The apparatus according to claim 17, wherein said providing section includes a parameter detecting section for providing randomness to the outcome of the code reading operation by detecting parameters relating to a shape of said code.

22. The apparatus according to claim 17, wherein said providing section includes a parameter detecting section for providing randomness to the outcome of the code reading operation by detecting parameters relating to missing information on components missing from said code.

23. The apparatus according to claim 1, wherein said randomness providing section includes a providing section for providing randomness to the outcome of the code reading operation by detecting parameters specific to the code reading apparatus itself.

24. The apparatus according to claim 23, wherein said providing section includes a parameter detecting section for providing randomness to the outcome of the code reading operation by detecting parameters relating to positions for detecting predetermined components of said code.

25. The apparatus according to claim 23, wherein said providing section includes a parameter detecting section for providing randomness to the outcome of the code reading operation by detecting parameters relating to a lightness used for said code reading operation.

26. The apparatus according to claim 23, wherein said providing section includes a parameter detecting section for providing randomness to the outcome of the code reading operation by detecting parameters relating to a size of said read code.

27. The apparatus according to claim 23, wherein said providing section includes a parameter detecting section for providing randomness to the outcome of the code reading operation by detecting parameters relating to a shape of said read code.

28. The apparatus according to claim 23, wherein said providing section includes a parameter detecting section for providing randomness to the outcome of the code reading operation by detecting parameters relating to missing information on components missing from said read code.

29. The apparatus according to claim 1, wherein said randomness providing section includes a parameter detecting section for providing randomness to the outcome of the code reading operation by detecting parameters relating to a positional relationship of predetermined components of said code.

30. The apparatus according to claim 1, wherein said randomness providing section includes a parameter detecting section for providing randomness to the outcome of the code reading operation by detecting parameters relating to a brightness of each of predetermined components of said code.

31. The apparatus according to claim 1, wherein said randomness providing section includes a parameter detecting section for providing randomness to the outcome of the code reading operation by detecting parameters relating to a size of each of predetermined components of said code.

32. The apparatus according to claim 1, wherein said randomness providing section includes a parameter detecting section for providing randomness to the outcome of the code reading operation by detecting parameters relating to a shape of each of predetermined components of said code.

33. The apparatus according to claim 1, wherein said randomness providing section includes a parameter detecting section for providing randomness to the outcome of the code reading operation by detecting parameters relating to missing information on components missing from said read code.

34. The apparatus according to claim 1, further comprising a memory section for storing a plurality of pieces of information; and wherein said randomness providing section includes an output control section for changing an output from said memory section by selecting any one of said plurality of pieces of information stored in said memory section.

35. The apparatus according to claim 34, wherein said information stored in said memory section includes at least one of a piece of text information, a piece of sound information, a piece of image information and a piece of program information.

36. The apparatus according to claim 34, wherein:
said information stored in said memory section includes a program for selecting a motion out of a plurality of motions; and
said randomness providing section includes a selecting section for selecting one of said motions.

37. The apparatus according to claim 34, wherein:
said information stored in said memory section includes a program for handling program parameters; and
said randomness providing section includes a control section for varying the program parameters to modify operation of said program.

38. The apparatus according to claim 1, wherein:
said data recorded on said recording medium as optically readable code includes a plurality of pieces of information; and
said randomness providing section includes an output modifying section for modifying the output of said output section by selecting any one of said plurality of pieces of information read from said recording medium.

39. The apparatus according to claim 38, wherein:
said information recorded in said recording medium includes at least one of a piece of text information, a piece of sound information, a piece of image information and a piece of program information.

40. The apparatus according to claim 38, wherein:
said information recorded in said recording medium includes a program for selecting a motion out of a plurality of motions; and said randomness providing section includes a selecting section for selecting one of said motions.

41. The apparatus according to claim 38, wherein:

said information stored in said recording medium includes a program for handling program parameters; and said randomness providing section includes a control section for varying the program parameters to modify operation of said program.

42. An entertainment system comprising:

an operating section for receiving an operation command from a user;

an output section for performing at least one of a display output and a sound output in accordance with the operation command received by said operating section;

a reading section for optically reading an optically readable code from a recording medium on which data is recorded as the optically readable code; and a randomness providing section for providing an outcome of a code reading operation of said reading section with randomness at a time of an output operation of said output section based on the outcome of the code reading operation of said reading section, so that the output of said output section, which is based on the outcome of said code reading operation, is varied by the randomness provided by said randomness providing section.

43. A recording medium comprising:

a part recording data as an optically readable code; and a part recording no code, wherein:
said data recorded as the optically readable code includes output information to be output and a plurality of pieces of information to be used for providing the output information with randomness; and when said data recorded as the optically readable code is read by a code reading apparatus, the output information is output in a varied manner according to one of said pieces of information for providing the randomness which is selected from said plurality of pieces of information.

44. The medium according to claim 43, wherein said information contained in said data recorded as the optically readable code includes at least one of a piece of text information, a piece of sound information, a piece of image information and a piece of program information.

45. A recording medium comprising:

a part recording data as an optically readable code; and a part recording no code, wherein:
said data recorded as the optically readable code includes information to be provided with randomness and a program for selecting a motion out of a plurality of motions; and one of said motions is selected to vary an output of said information to be provided with randomness as a result of an operation of reading said code by a code reading apparatus.

46. A recording medium comprising:

a part recording data as an optically readable code; and a part recording no code, wherein:
said data recorded as the optically readable code includes output information to be output and a program for handling program parameters to provide the output information with randomness; and when said data recorded as the optically readable code is read by a code reading apparatus, said program parameters are varied to vary operation of said program and to vary an output of said output information with randomness.

* * * * *